(12) United States Patent
Sasaki et al.

(10) Patent No.: US 9,791,208 B2
(45) Date of Patent: Oct. 17, 2017

(54) CONTROL METHOD FOR AIR-CONDITIONING EQUIPMENT, PROGRAM, AND MOBILE INFORMATION TERMINAL

(71) Applicant: Panasonic Intellectual Property Corporation of America, Torrance, CA (US)

(72) Inventors: Taiji Sasaki, Osaka (JP); Yoichi Nishida, Osaka (JP); Tetsuji Fuchikami, Osaka (JP); Shunji Harada, Osaka (JP); Masashi Sugiyama, Shiga (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 584 days.

(21) Appl. No.: 14/509,248

(22) Filed: Oct. 8, 2014

(65) Prior Publication Data

US 2015/0105917 A1    Apr. 16, 2015

(30) Foreign Application Priority Data

Oct. 15, 2013    (JP) ................................. 2013-214782
Jul. 28, 2014    (JP) ................................. 2014-153013

(51) Int. Cl.
     *G05D 23/13*      (2006.01)
     *F25D 29/00*      (2006.01)
     (Continued)

(52) U.S. Cl.
     CPC .......... *F25D 29/00* (2013.01); *F24F 11/0009* (2013.01); *G05B 15/02* (2013.01);
     (Continued)

(58) Field of Classification Search
None
See application file for complete search history.

(56) References Cited

U.S. PATENT DOCUMENTS

| | | | |
|---|---|---|---|
| 7,539,559 B2 * | 5/2009 | Kanai | F24F 11/0034 165/11.1 |
| 8,090,477 B1 * | 1/2012 | Steinberg | G05D 23/1923 700/276 |

(Continued)

FOREIGN PATENT DOCUMENTS

JP      2013-076493      4/2013

OTHER PUBLICATIONS

Ueki et al. "Development of Multi-functional Sensor Module for Energy Saving Air Conditioner System", 2012 IEEE, pp. 96-100.*

(Continued)

*Primary Examiner* — Van Nguyen
(74) *Attorney, Agent, or Firm* — Greenblum & Bernstein, P.L.C.

(57) ABSTRACT

An air-conditioning setting screen has a coordinate space defined by a Y-axis along which temperature items are indicated in increments of one degree and an X-axis along which time-point items are indicated in increments of one hour. Operation points PT corresponding to the time-point items are arranged in the coordinate space. The air-conditioning setting screen displays time-series changes in a previous day's body-movement values such that the density of a background color is higher for times at which the body-movement value is larger and the density of a background color is lower for times at which the body-movement value is smaller.

14 Claims, 30 Drawing Sheets

(51) Int. Cl.
G05D 23/19 (2006.01)
F24F 11/00 (2006.01)
G05B 15/02 (2006.01)

(52) U.S. Cl.
CPC ..... G05D 23/1904 (2013.01); G05D 23/1905 (2013.01); *F24F 2011/0036* (2013.01); *F24F 2011/0071* (2013.01); *G05B 2219/2614* (2013.01)

(56) References Cited

U.S. PATENT DOCUMENTS

| | | | | |
|---|---|---|---|---|
| 8,509,922 | B2* | 8/2013 | Yum | H04L 12/2809 700/17 |
| 8,712,590 | B2* | 4/2014 | Steinberg | G05D 23/1923 700/276 |
| 9,134,715 | B2* | 9/2015 | Geadelmann | G05B 15/02 |
| 9,234,668 | B2* | 1/2016 | Fadell | G05D 23/1902 |
| 9,645,589 | B2* | 5/2017 | Leen | G05D 23/1917 |
| 2013/0307862 | A1* | 11/2013 | Gyota | F28F 27/00 345/589 |

OTHER PUBLICATIONS

Al-Ghasem et al. "Air Conditioner Control Using Neural Network and PID Controller", 2012 IEEE, 5 pages.*

* cited by examiner

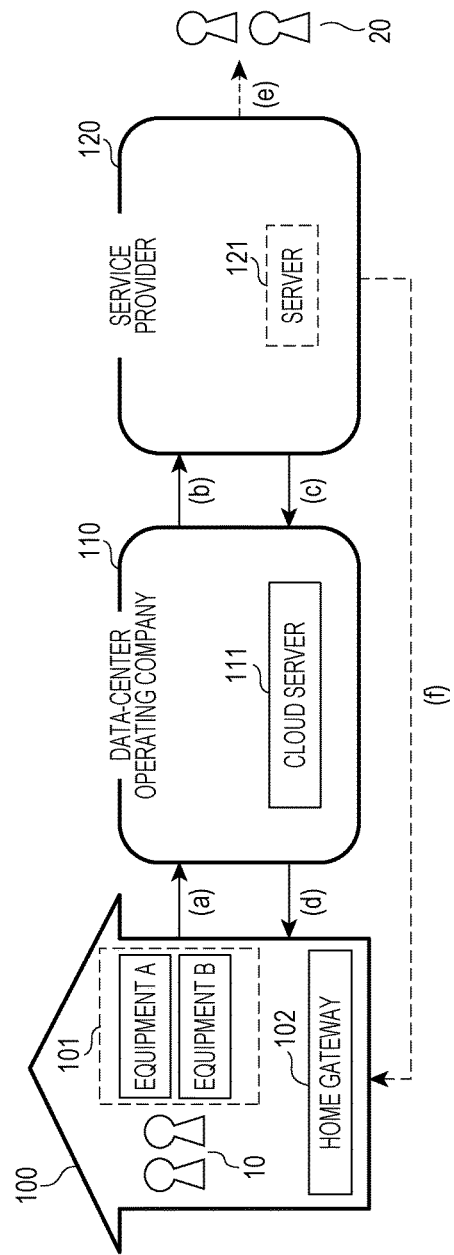

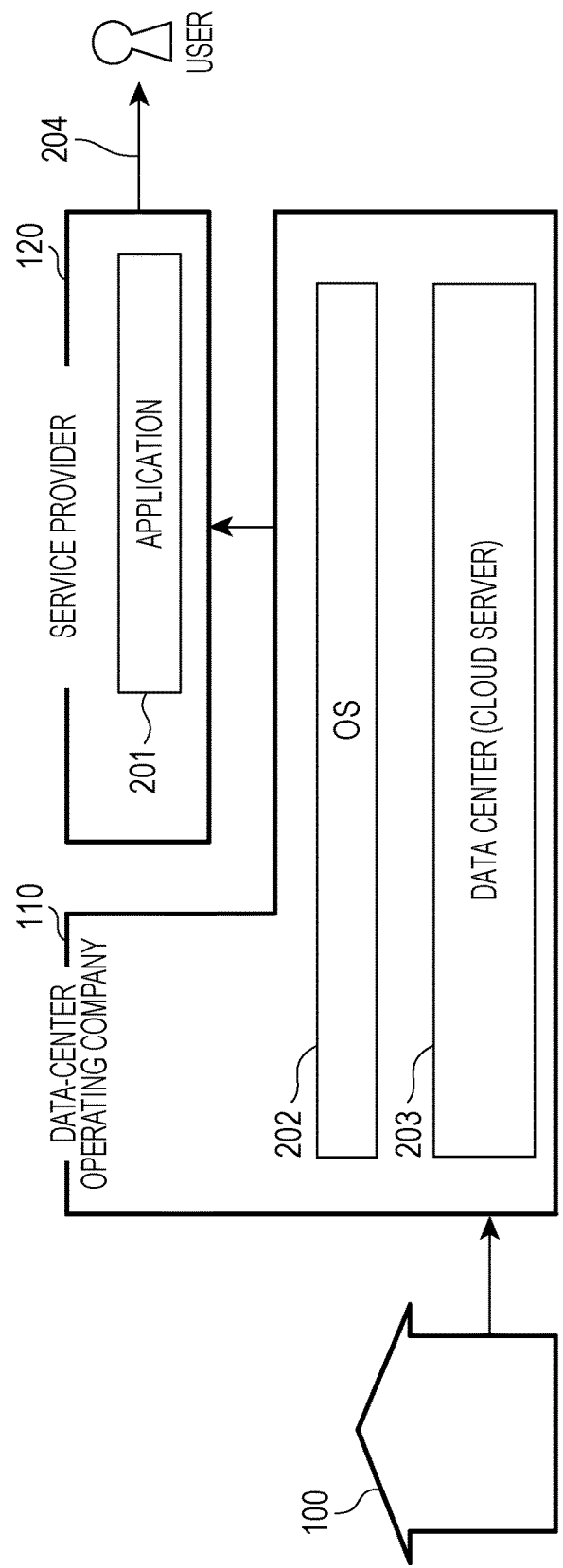

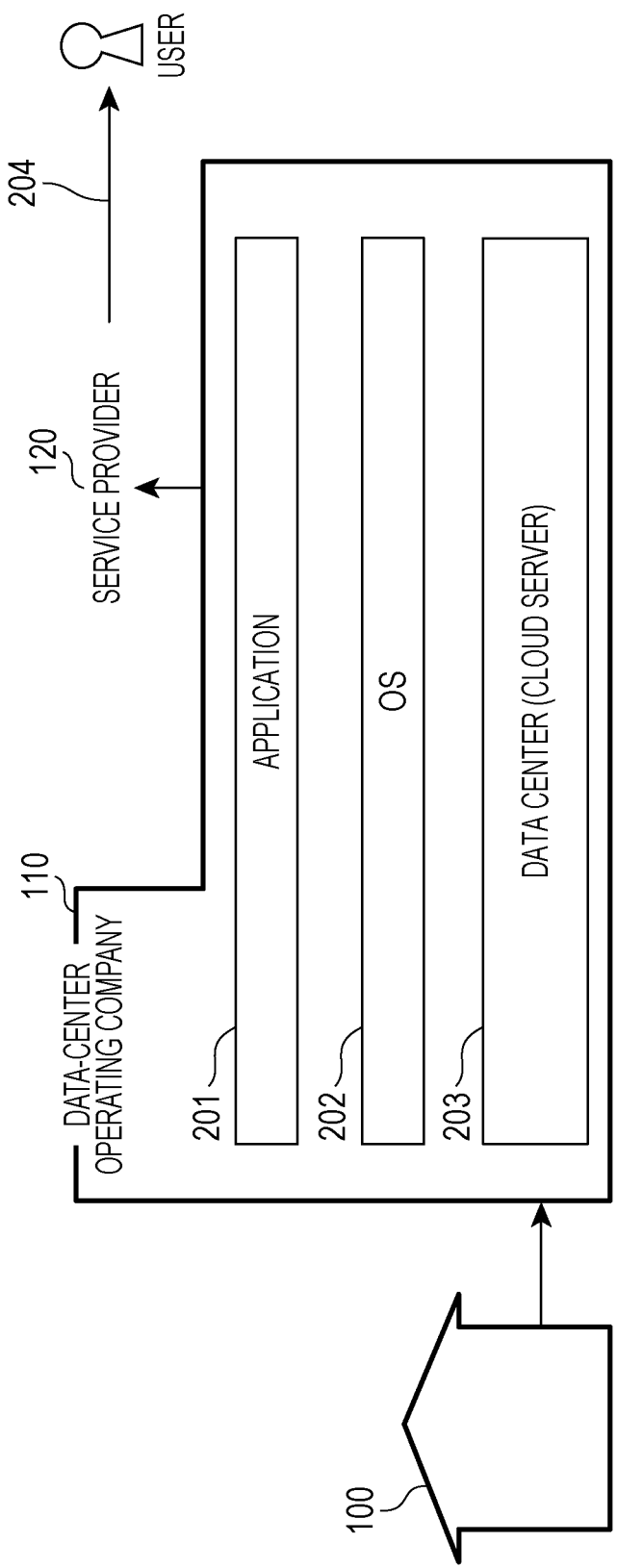

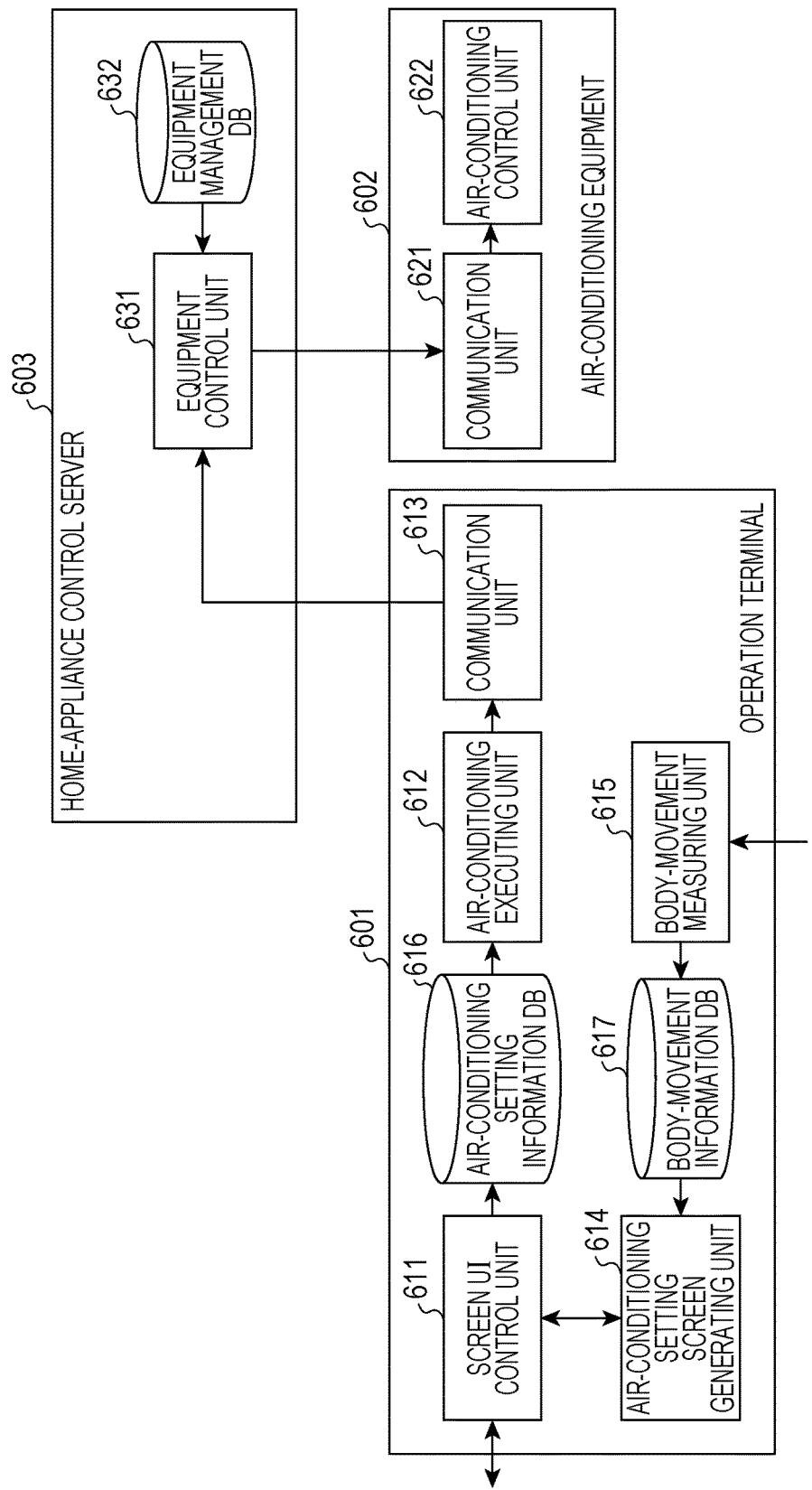

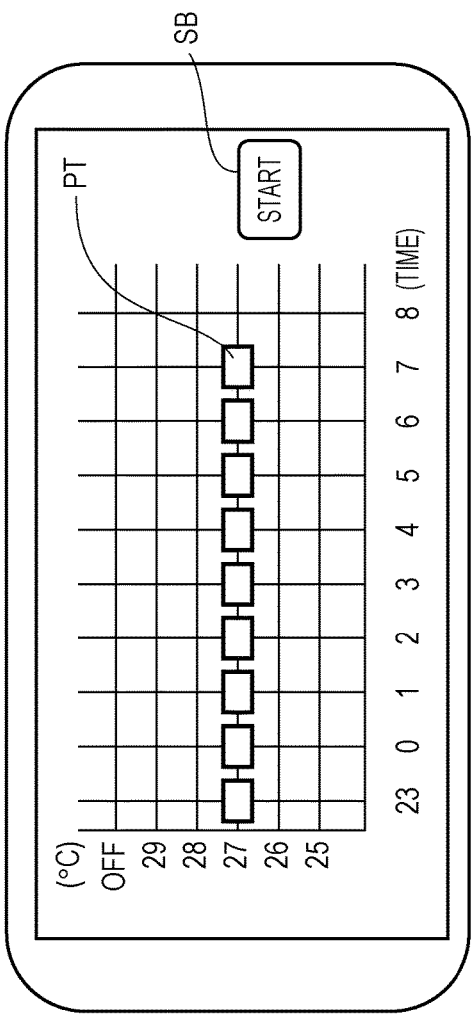
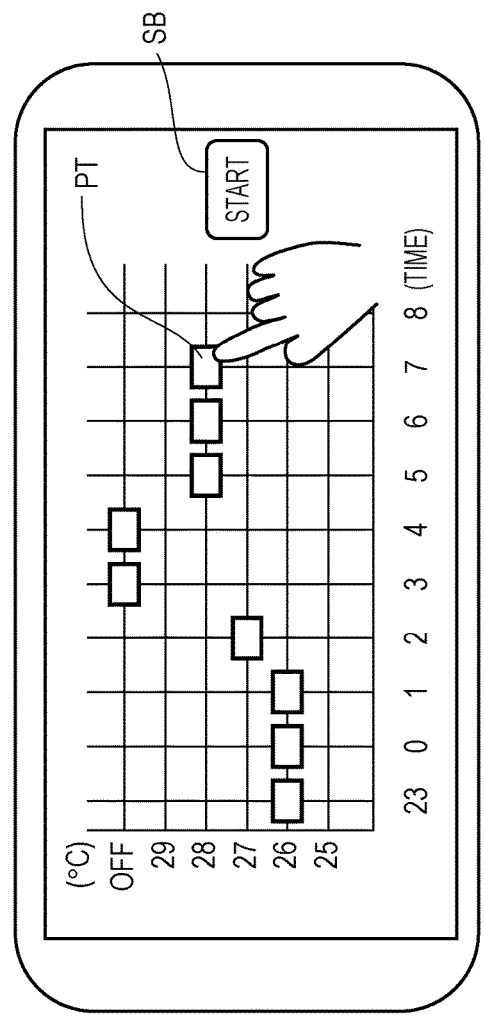
FIG. 7A
FIG. 7B

| OPERATION ID | EQUIPMENT ID | EXECUTION TIME | EXECUTION-STATUS FLAG | OPERATION INSTRUCTION ||||| 
|---|---|---|---|---|---|---|---|
| | | | | OPERATION STATUS | OPERATION MODE | SET TEMPERATURE | BLOWING LEVEL | BLOWING DIRECTION |
| 1 | 00001 | AUGUST 23, 2013, 23:00 | 0x01 (DONE) | 0x01 (ON) | 0x01 (COOLING) | 26 | 0x01 (AUTO) | 0x01 (AUTO) |
| 2 | 00001 | AUGUST 24, 2013, 00:00 | 0x01 (DONE) | 0x01 (ON) | 0x01 (COOLING) | 26 | 0x01 (AUTO) | 0x01 (AUTO) |
| 3 | 00001 | AUGUST 24, 2013, 01:00 | 0x01 (DONE) | 0x01 (ON) | 0x01 (COOLING) | 26 | 0x01 (AUTO) | 0x01 (AUTO) |
| 4 | 00001 | AUGUST 24, 2013, 02:00 | 0x00 (UNDONE) | 0x01 (ON) | 0x01 (COOLING) | 27 | 0x01 (AUTO) | 0x01 (AUTO) |
| 5 | 00001 | AUGUST 24, 2013, 03:00 | 0x00 (UNDONE) | 0x00 (OFF) | 0x00 | 0 | 0 | 0 |
| 6 | 00001 | AUGUST 24, 2013, 04:00 | 0x00 (UNDONE) | 0x00 (OFF) | 0x00 | 0 | 0 | 0 |
| 7 | 00001 | AUGUST 24, 2013, 05:00 | 0x00 (UNDONE) | 0x01 (ON) | 0x01 (COOLING) | 28 | 0x01 (AUTO) | 0x01 (AUTO) |
| 8 | 00001 | AUGUST 24, 2013, 06:00 | 0x00 (UNDONE) | 0x01 (ON) | 0x01 (COOLING) | 28 | 0x01 (AUTO) | 0x01 (AUTO) |
| 9 | 00001 | AUGUST 24, 2013, 07:00 | 0x00 (UNDONE) | 0x01 (ON) | 0x01 (COOLING) | 28 | 0x01 (AUTO) | 0x01 (AUTO) |

| BODY-MOVEMENT ID | MEASUREMENT START TIME | MEASUREMENT TIME | VALUE |
|---|---|---|---|
| 1 | AUGUST 23, 2013, 23:00 | 5 MINUTES | 2.12 |
| 2 | AUGUST 23, 2013, 23:05 | 5 MINUTES | 1.82 |
| 3 | AUGUST 23, 2013, 23:10 | 5 MINUTES | 1.58 |
| 4 | AUGUST 23, 2013, 23:15 | 5 MINUTES | 1.60 |
| 5 | AUGUST 23, 2013, 23:20 | 5 MINUTES | 1.20 |
| 6 | AUGUST 23, 2013, 23:25 | 5 MINUTES | 0.15 |
| 7 | AUGUST 23, 2013, 23:30 | 5 MINUTES | 0.02 |
| 8 | AUGUST 23, 2013, 23:35 | 5 MINUTES | 0.00 |
| 9 | AUGUST 23, 2013, 23:40 | 5 MINUTES | 0.05 |
| ... | ... | | |

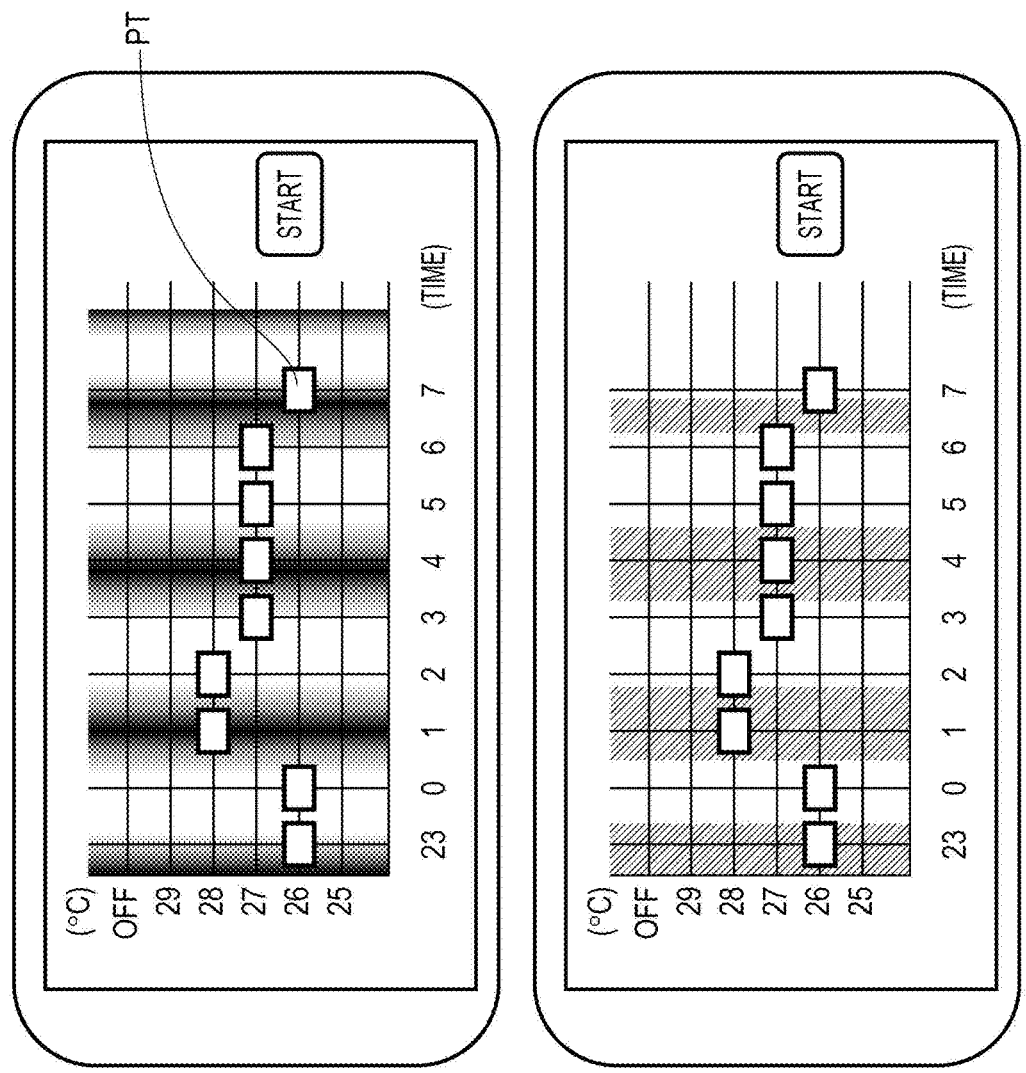

FOR COOLING

FOR HEATING

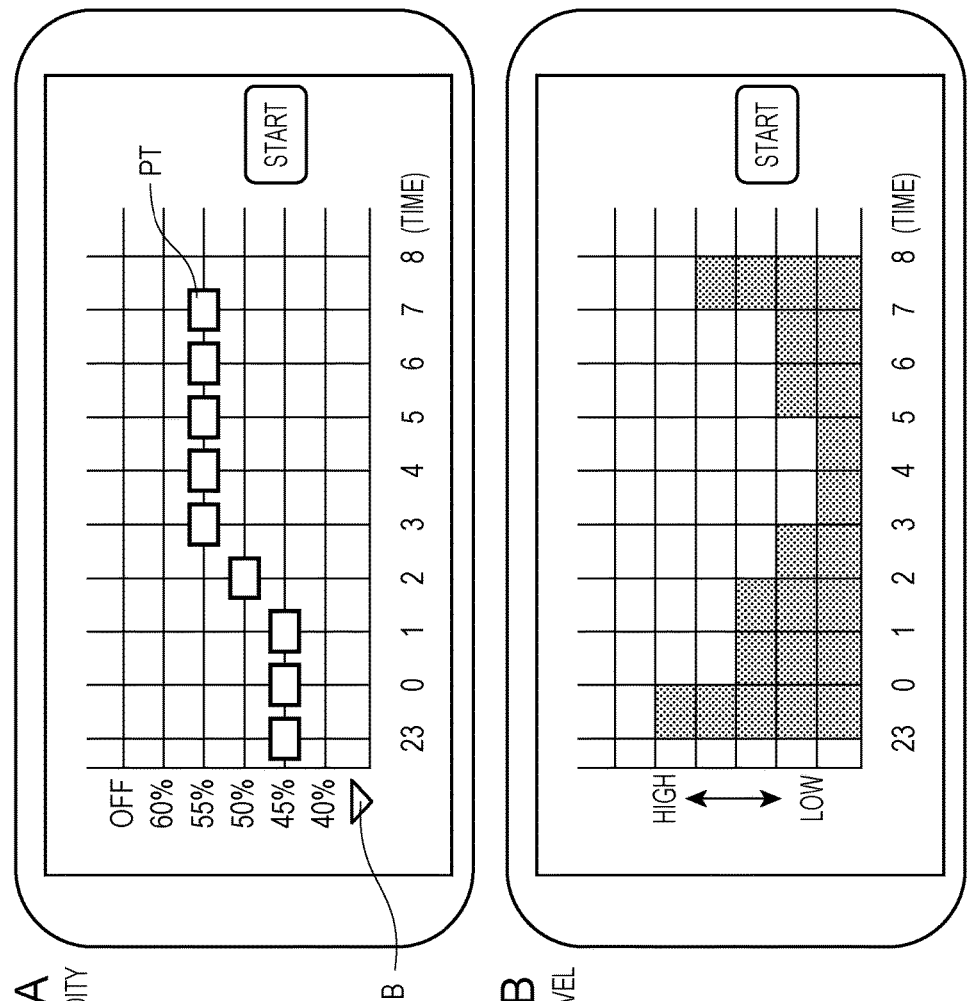

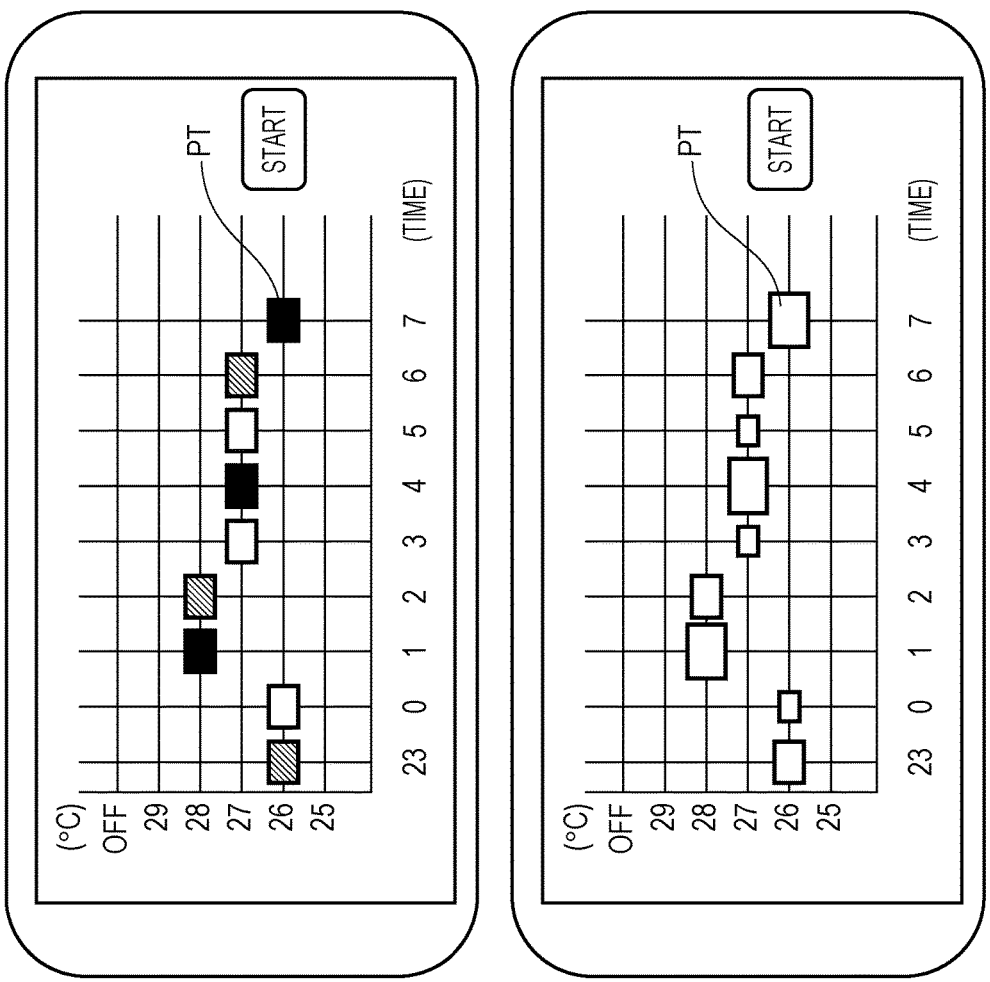

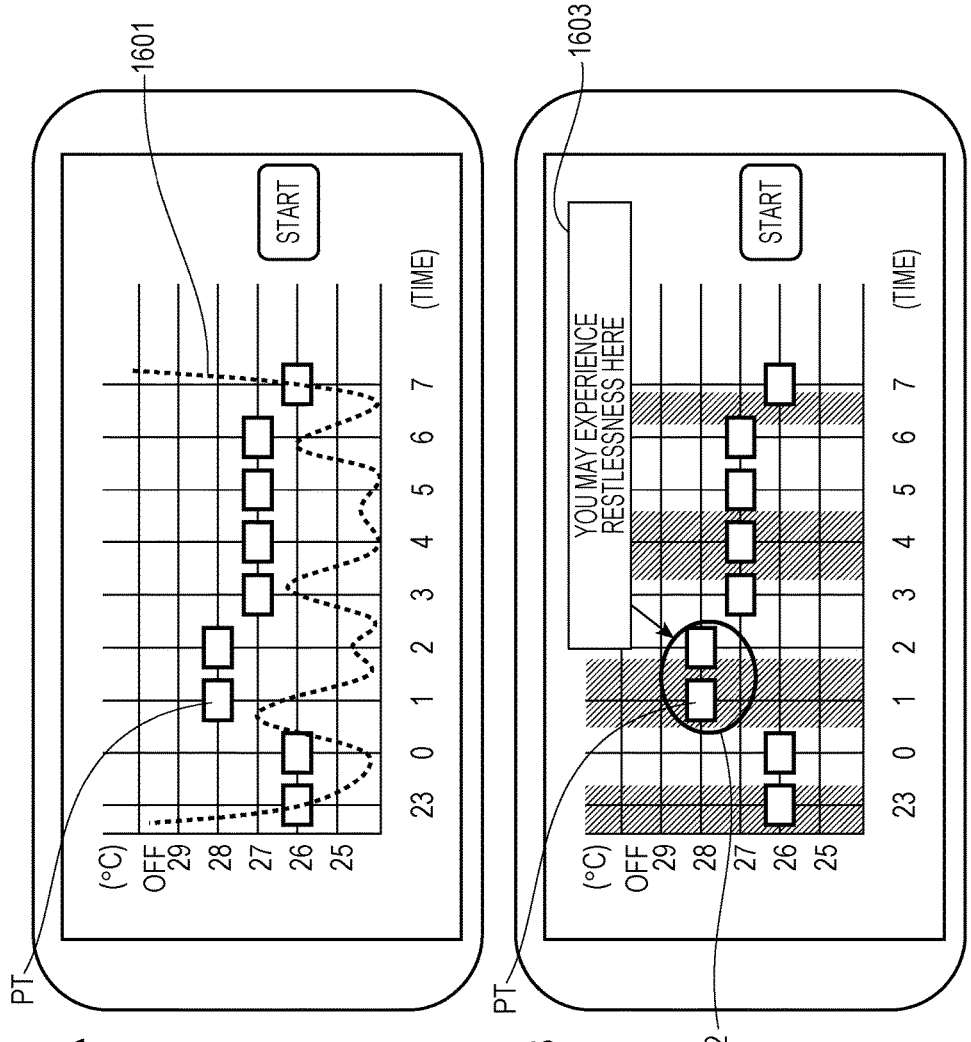

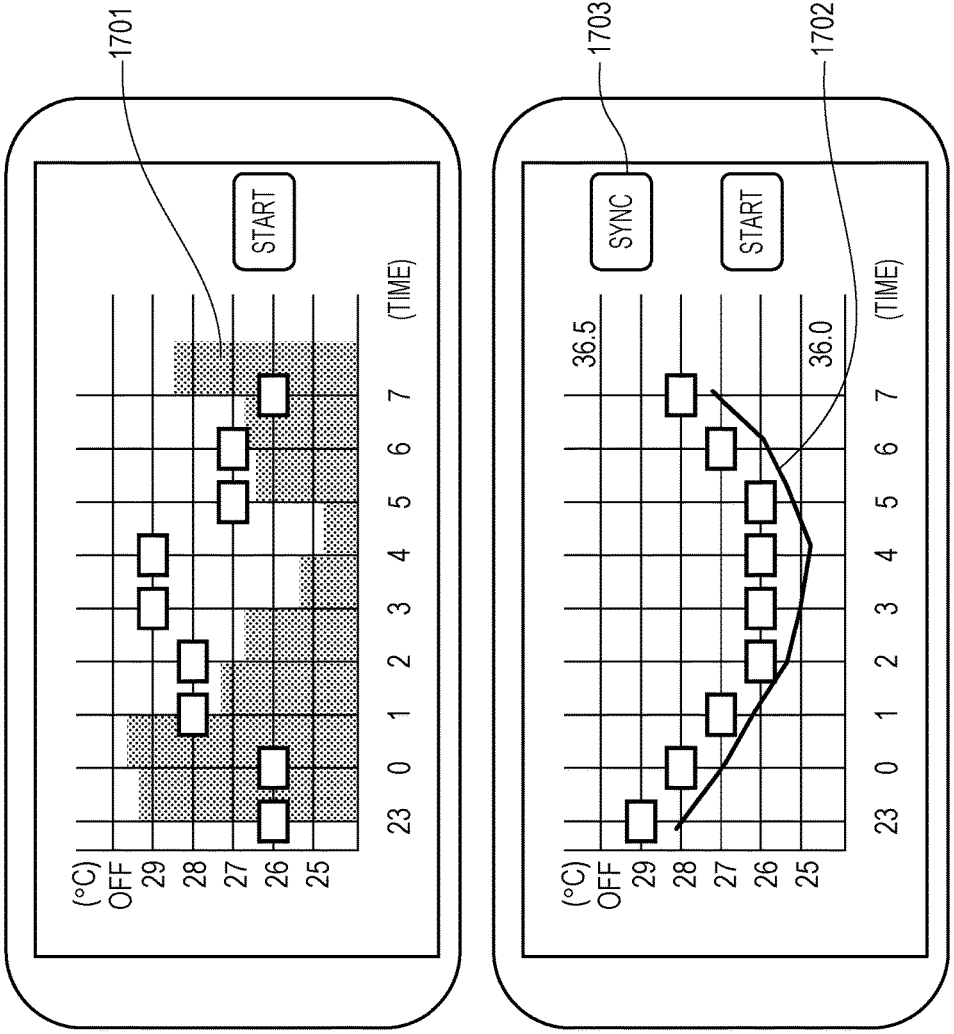

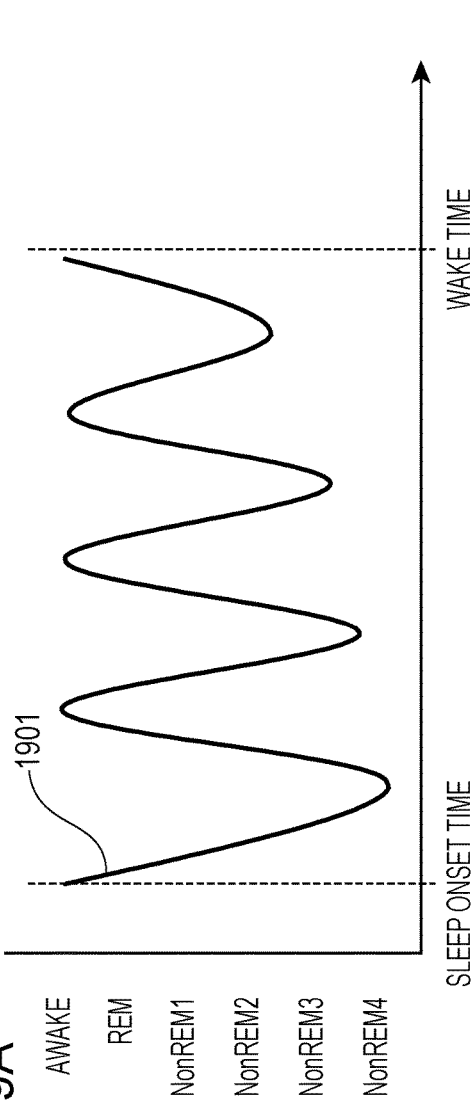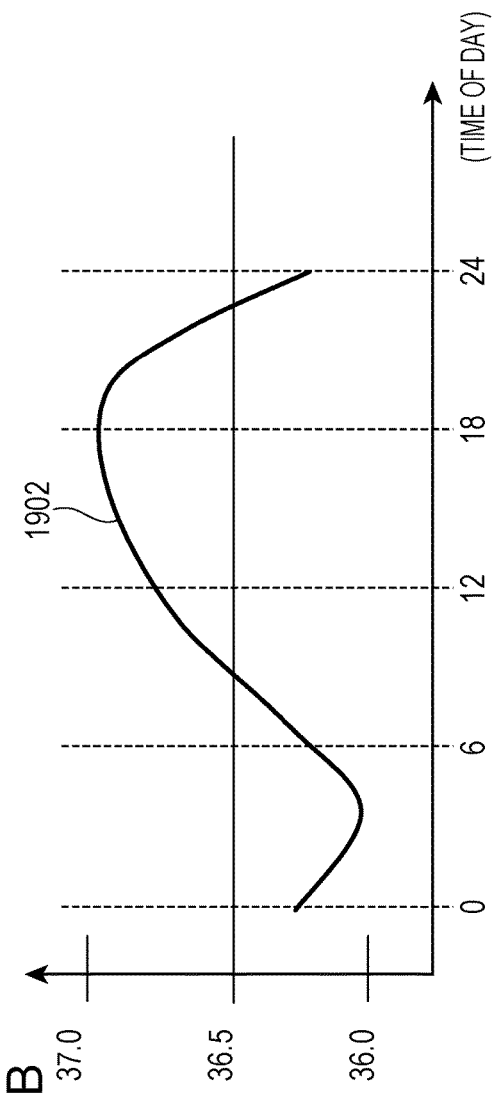

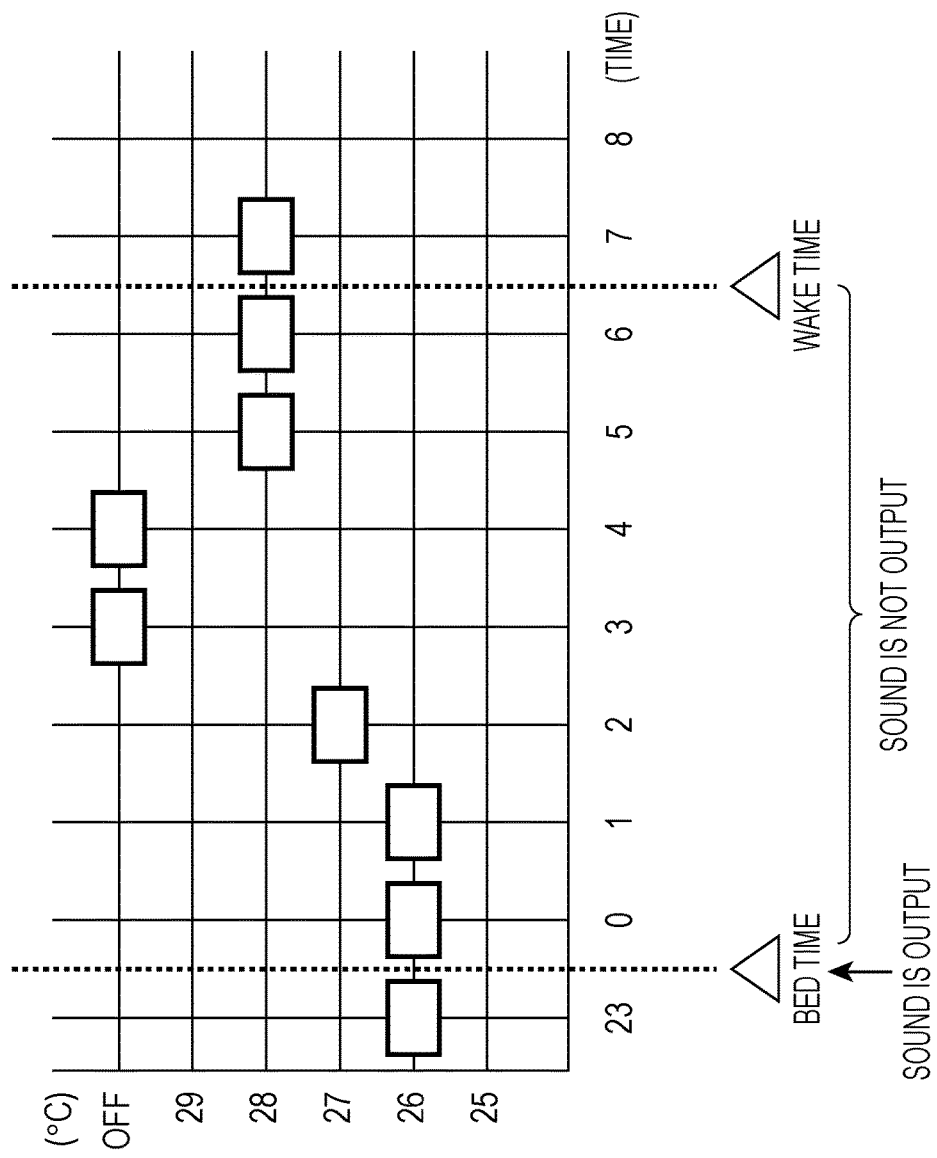

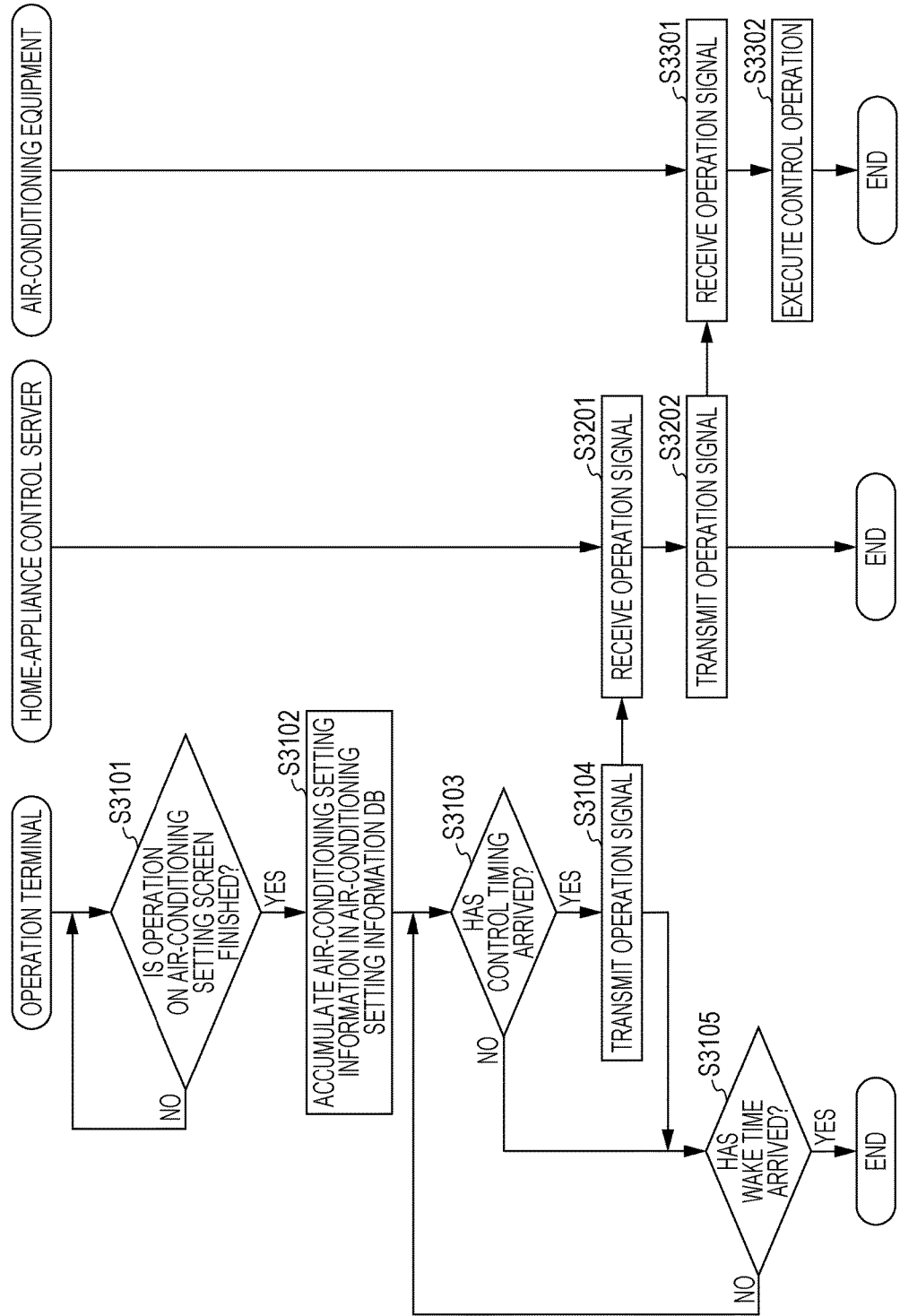

CONTROL METHOD FOR AIR-CONDITIONING EQUIPMENT, PROGRAM, AND MOBILE INFORMATION TERMINAL

BACKGROUND OF THE INVENTION

1. Field of the Invention

The present disclosure relates to a user interface for setting a control operation for air-conditioning equipment (particularly, air conditioners).

2. Description of the Related Art

In recent years, with the widespread use of smartphones, technological research for remotely controlling household electrical and electronic equipment by using smartphones is being carried out.

For example, Japanese Unexamined Patent Application Publication No. 2013-76493 (hereinafter referred to as "Patent Document 1") discloses a touch-panel remote controller that displays, on a display, an operation screen on which time is indicated on a horizontal axis and set temperatures are indicated on a vertical axis and that allows a user to intuitively perform temperature setting for a desired time point by vertically sliding his or her finger at the position of the desired time point on the operation screen.

However, the technology disclosed in Patent Document 1 has room for improvement in that decision material for performing temperature setting for each time point is presented to the user.

SUMMARY OF THE INVENTION

In one general aspect, the techniques disclosed here feature a control method for a mobile information terminal having a display to control air-conditioning equipment connected through a network. The control method causing the mobile information terminal to: display, on the display, a temperature setting screen on which set temperatures of the air-conditioning equipment are settable for respective time slots; output pieces of set temperature information for the respective time slots set on the temperature setting screen to the network at a predetermined timing as the set temperatures of the air-conditioning equipment; measure body-movement values of a user for the respective time slots, by using an acceleration sensor; and change a view of the temperature setting screen, based on the body-movement values of the user for the time slots, and display the view on the display. These general and specific aspects may be implemented using a system, a method, and a computer program, and any combination of systems, methods, and computer programs.

According to the general aspect described above, when the user performs temperature setting of an air conditioner for each time point, the view of the temperature setting screen is changed based on the body-movement values, thus allowing the user to easily perform an operation for performing temperature setting for each time point.

BRIEF DESCRIPTION OF THE DRAWINGS

FIG. 1A illustrates an overview of a service provided in an embodiment of the present disclosure;

FIG. 4 illustrates a service type (a PaaS using type) in the embodiment of the present disclosure;

FIG. 5 illustrates a service type (a SaaS using type) in the embodiment of the present disclosure;

FIG. 6 is a block diagram illustrating an air-conditioning control system in the embodiment of the present disclosure;

FIGS. 7A and 7B each illustrate an air-conditioning setting screen according to the embodiment of the present disclosure;

FIG. 8 is a table illustrating one example of the data structure of an air-conditioning setting information database (DB) in the embodiment of the present disclosure;

FIGS. 10A and 10B illustrate examples of an air-conditioning setting screen on which air-conditioning setting information and body-movement information are reflected in the embodiment of the present disclosure;

FIGS. 13A and 13B illustrate air-conditioning setting screens for setting the humidity and the blowing level, respectively, of the air-conditioning equipment in the embodiment of the present disclosure;

FIGS. 14A and 14B illustrate other examples of the air-conditioning setting screen in the embodiment of the present disclosure;

FIGS. 16A and 16B illustrate other examples of the air-conditioning setting screen in the embodiment of the present disclosure;

FIGS. 17A and 17B illustrate air-conditioning setting screens when an electricity cost and a heart rate are respectively used as UI change-source information in the embodiment of the present disclosure;

FIGS. 19A and 19B illustrate air-conditioning setting screens when a sleep rhythm and a core body temperature are respectively used as the UI change-source information in the embodiment of the present disclosure;

FIG. 20 illustrates a method for outputting an operation sound in the embodiment of the present disclosure;

FIG. 30 is a flowchart illustrating processing in the air-conditioning control system when an operation signal is transmitted to the air-conditioning equipment.

Figure 1B:
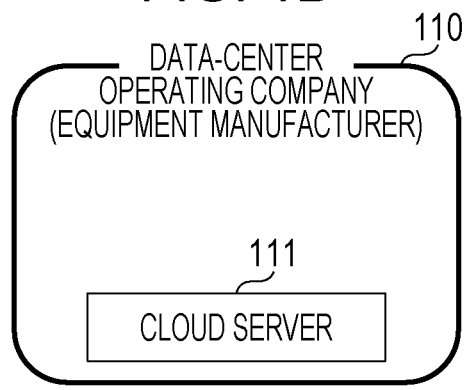
FIG. 1B illustrates an overview of a service provided in the embodiment of the present disclosure.

DESCRIPTION OF THE PREFERRED EMBODIMENT (Knowledge Underlying Present Disclosure)

In recent years, audio-visual consumer electronics, such as televisions and recorders, that are connectable to the Internet have been widely used, and services of delivering movies, sports videos, and so on, have been provided. Home appliances, called "household electrical and electronic equipment", such as scales, activity trackers, rice cookers, microwave ovens, and refrigerators, are increasingly connected to the Internet, and a variety of services are being provided.

One example of such services is a remote control service for air conditioners connected to the Internet. The service allows a user at a location away from home to control his or her home air conditioner through the Internet. With this service, when the user turns on the air conditioner while away from home before going home, he or she can go home where the rooms are sufficiently cooled down.

In addition, smartphones, typified by iPhone (registered trademark), have come into widespread use, and systems in which home appliances connected to the Internet can be controlled using applications on the smartphones are being provided. Use of this function makes it possible to provide users with user interfaces making full use of graphics, which has not been made possible with legacy home-appliance remote controllers.

According to the touch-panel remote controller disclosed in Patent Document 1 noted above, a prediction graph showing changes in outdoor air temperature over time is shown on an operation screen on which an atmospheric temperature is indicated on a vertical axis and time is indicated on a horizontal axis. A user touches the position of a desired time point with his or her finger and performs a slide operation vertically to perform temperature setting of the air conditioner for the current day. According to Patent Document 1, since the prediction graph for the outdoor air temperature is displayed on the operation screen, the user can perform temperature setting of the air conditioner by taking the prediction graph into account.

In Patent Document 1, however, no consideration is given to performing temperature setting of the air conditioner by taking the restlessness of the user during sleep into account.

Thus, when temperature setting of the air conditioner for respective time points is performed at the onset of sleep, it is difficult for the user to decide for what time and how to perform the temperature setting. Since the user cannot accurately determine in what state he or she was during sleep (e.g., at what time and to what degree he or she suffered restlessness), it is still difficult to make that decision, even if the system is configured such that the hourly temperature setting can be easily and finely performed. Hence, Patent Document 1 has room for improvement in that decision material for performing temperature setting of the air conditioner is presented to the user. Accordingly, the present disclosure provides the following measures for improvement.

A control method according to one aspect of the present disclosure is directed to a control method for a mobile information terminal having a display to control air-conditioning equipment connected through a network. The control method causes the mobile information terminal to: display, on the display, a temperature setting screen on which set temperatures of the air-conditioning equipment are settable for respective time slots; output pieces of set temperature information for the respective time slots set on the temperature setting screen to the network at a predetermined timing as the set temperatures of the air-conditioning equipment; measure body-movement values of a user for the respective time slots, by using an acceleration sensor; and change a view of the temperature setting screen, based on the body-movement values of the user for the time slots, and display the view on the display.

According to this aspect, the view of the temperature setting screen is changed based on the user's body-movement values measured by the acceleration sensor, and the resulting view is displayed. Thus, the user can set the set temperature for each time slot, while considering changes in the body-movement value. As a result, for example, when the body-movement value indicates the user's body movement during sleep, he or she can perform temperature setting, such as reducing the set temperature for a time slot in which the body movement was large because of restlessness. Thus, the user can easily perform temperature setting of the air-conditioning equipment.

In the aspect described above, background color of the temperature setting screen may be changed based on the body-movement values of the user for the respective time slots, and resulting background color may be displayed on the display.

In this case, changes in the body-movement value over time are displayed using the background color of the temperature setting screen. Thus, the user can perform temperature setting while referring to the background color and checking a time slot in which the body movement is large and a time slot in which the body movement is small. Also, since the body-movement values are displayed using the background color of the temperature setting screen, it is possible to prevent the display of the body-movement values from interfering with the display of the temperature setting screen. Also, since the body-movement values are displayed using the background color of the temperature setting screen, the user can smoothly perform temperature setting taking the body-movement values into account, without performing an input operation for switching the temperature setting screen to the display screen for the body-movement values.

In the aspect described above, the temperature setting screen may include images indicating temperature setting portions for the respective time slots, the images indicating the temperature setting portions for the respective time slots may be changed based on the body-movement values of the user for the respective time slots, and the resulting images may be displayed on the display.

According to this aspect, the images indicating the temperature setting portions for the respective time slots are changed based on the body-movement values of the user, and the resulting images are displayed. Thus, the user can perform temperature setting while referring to the operation setting portions and checking a time slot in which the body movement is large and a time slot in which the body movement is small. Also, since the body-movement values are displayed through changing of the images indicating the temperature setting portions, it is possible to prevent the display of the body-movement values from interfering with the display of the temperature setting screen. Also, since the body-movement values are displayed through changing of the images indicating the temperature setting portions, the user can smoothly perform temperature setting taking the body-movement values into account, without performing an input operation for switching the temperature setting screen to the display screen for the body-movement values.

In the aspect described above, colors of the images indicating the temperature setting portions for the respective time slots may be changed based on the body-movement values of the user for the respective time slots, and the resulting images may be displayed on the display.

In this case, since the body-movement value for each time slot is displayed with the color of the image indicating the temperature setting portion for the corresponding time slot, the user can easily recognize the body-movement value for each time slot.

In the aspect described above, sizes of the images indicating the temperature setting portions for the respective time slots may be changed based on the body-movement values of the user for the respective time slots, and the resulting images may be displayed on the display.

In this case, since the body-movement value for each time slot is indicated using the size of the image indicating the temperature setting portion for the corresponding time slot, the user can easily recognize the body-movement value for each time slot.

In the aspect described above, on the temperature setting screen, a background color for the time slot in which the body-movement value of the user exceeds a predetermined threshold may be displayed on the display, the background color being different from a background color for another time slot.

In this case, since only the background color for the time slot in which the body-movement value, which is an important as an index for temperature setting, is large is changed on the temperature setting screen, the amount of information is reduced compared with a case in which an arrangement in which all body-movement values are displayed, thus making it easier for the user to perform an operation for the temperature setting.

In the aspect described above, on the temperature setting screen, the color of the image indicating the temperature setting portion for the time slot in which the body-movement value of the user exceeds a predetermined threshold may be displayed on the display by using a color different from the color of the image indicating the temperature setting portion for another time slot.

In this case, since only the color of the temperature setting portion in the time slot in which the body-movement value, which is important as an index for temperature setting, is large is changed on the temperature setting screen, the amount of information is reduced compared with a case in which an arrangement in which the colors of all of the temperature setting portions are changed, thus making it easier for the user to perform an operation for the temperature setting.

In the aspect described above, on the temperature setting screen, the image indicating the temperature setting portion for the time slot in which the body-movement value of the user exceeds a predetermined threshold may be displayed on the display with a larger size than the size of the image indicating the temperature setting portion for another time slot.

In this case, since only the size of the temperature setting portion in the time slot in which the body-movement value, which is important as an index for temperature setting, is large is changed on the temperature setting screen, the amount of information is reduced compared with a case in which an arrangement in which the sizes of all of the temperature setting portions are changed, thus making it easier for the user to perform an operation for the temperature setting.

In the aspect described above, a graph indicating the body-movement values of the user in a time series may be displayed superimposed on the temperature setting screen on the display.

In this case, since the body-movement values are displayed in the form of a graph, the user can quickly recognize changes in the body-movement value over time.

In the aspect described above, on the temperature setting screen, luminance of an area inside the graph indicating the body-movement values in a time series may be displayed such that an area where the body-movement value is larger is displayed with a higher luminance.

In this case, since the area inside the graph is displayed with a higher luminance for a larger body-movement value, the user can more clearly recognize changes in the body-movement value over time.

In the aspect described above, the temperature setting screen may include a control start button for outputting, when the user starts to sleep, the pieces of set temperature information for the respective time slots to the network, the pieces of set temperature information being set on the temperature setting screen; and the predetermined timing may be timing at which an operation for selecting the control start button is input.

In this case, before starting to sleep, when the user performs only an input operation for selecting the control start button after inputting the pieces of set temperature information for the respective time slots in sleep time, the air-conditioning equipment can be automatically operated for a desired temperature during sleep.

In the aspect described above, the set temperature information may include information for time slots during sleep of the user; and the view of the temperature setting screen is changed based on past body-movement values of the user in respective time slots during sleep.

In this case, since the temperature setting screen is changed based on the past body-movement values in the time slots during sleep of the user, he or she can perform temperature setting for sleep time on the current day by taking the past body-movement values during sleep into account.

(Overview of Service to be Provided)

FIG. 1A illustrates an overview of a service according to the present disclosure.

A group 100 is, for example, a company, an entity, or a household, and the scale thereof is not limited. At the group 100, a plurality of pieces of equipment 101, including equipment A and equipment B, and a home gateway 102 are provided. The pieces of equipment 101 include equipment that can connect to the Internet (e.g., a smartphone, a personal computer (PC), and a television (TV)) and equipment that is incapable of connecting to the Internet on their own (e.g., lighting equipment, a washing machine, and a refrigerator). The pieces of equipment 101 may also include equipment that is incapable of connecting to the Internet on their own but that can connect to the Internet via the home gateway 102. Also, the group 100 includes users 10 of the pieces of equipment 101.

Figure 1C:
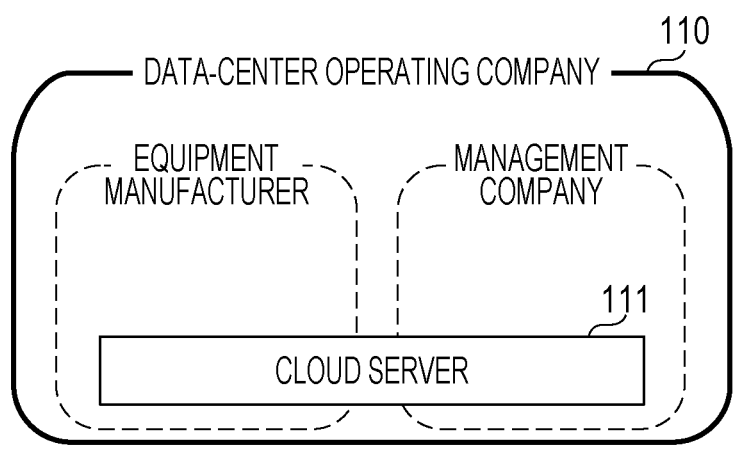
FIG. 1C illustrates an overview of a service provided in the embodiment of the present disclosure.

A data-center operating company 110 has a cloud server 111. The cloud server 111 is a virtualization server that cooperates with various types of equipment through the Internet. The cloud server 111 mainly manages, for example, big data that is difficult to process with a typical database management tool or the like. The data-center operating company 110 performs data management, management of the cloud server 111, operation of a data center that performs the management, and so on. Details of a service provided by the data-center operating company 110 are described later. In this case, the data-center operating company 110 is not limited to a company that performs only data management, operation of the cloud server 111, or the like. For example, when an equipment manufacturer that develops and manufactures one type of equipment of the pieces of equipment 101 also performs data management, management of the cloud server 111, and so on, this equipment manufacturer corresponds to the data-center operating company 110 (see FIG. 1B). The data-center operating company 110 is not limited to a single company. For example, when the equipment manufacturer and another management company perform data management and operation of the cloud server 111 in cooperation with each other or in a shared manner, one of or both the equipment manufacturer and the other management company correspond(s) to the data-center operating company 110 (see FIG. 1C).

A service provider 120 has a server 121. The scale of the "server 121" as used herein is not limited, and examples of the server 121 include a memory in a PC and so on. The service provider 120 may or may not have the server 121.

In the service described above, the home gateway 102 is not essential. For example, when the cloud server 111 performs all data management, the home gateway 102 is not necessary. There are also cases in which the pieces of equipment 101 do not include any equipment that is incapable of connecting to the Internet on their own, as in a case in which all kinds of equipment in a home are connected to the Internet.

Next, a description will be given of a flow of log information of the equipment in the service described above.

First, the equipment A or the equipment B in the group 100 transmits log information to the cloud server 111 in the data-center operating company 110. The cloud server 111 accumulates the log information of the equipment A or the equipment B (as indicated by arrow (a) in FIG. 1A). In this case, the term "log information" refers to information indicating, for example, operation states, operation dates and times, and so on of the pieces of equipment 101. Examples of the log information include the viewing history of a television, video-recording-reservation information of a recorder, the operation date and time of a washing machine, the amount of laundry thereof, the opening/closing date and time of a refrigerator door, and the number of times it was opened/closed. The log information, however, is not limited to those pieces of information and may be any information that can be acquired from any kind of equipment. The log information may also be directly supplied from the pieces of equipment 101 to the cloud server 111 through the Internet. The log information from the pieces of equipment 101 may also be temporarily aggregated in the home gateway 102 and be supplied from the home gateway 102 to the cloud server 111 in the data-center operating company 110.

Next, the cloud server 111 in the data-center operating company 110 supplies the aggregated log information to the service provider 120 in a certain unit of information. The certain unit of information may be a unit with which the data-center operating company 110 can organize the aggregated information and can supply it to the service provider 120 or may be a unit requested by the service provider 120. Although the log information has been described above as being supplied in a certain unit of information, it does not necessarily have to be supplied in a certain unit of information, and there are cases in which the amount of information to be supplied is changed depending on the situation. The log information is stored in the server 121 of the service provider 120 (as indicated by arrow (b) in FIG. 1A), as appropriate. The service provider 120 then organizes the log information into information that suits a service to be supplied to the users and supplies the organized log information to the users. The users to which the log information is supplied may be the users 10 of the pieces of equipment 101 or may be users 20 outside the group 100. A method for providing the users with a service may be, for example, a method in which the service is directly supplied from the service provider 120 to the users (as indicated by arrows (e) and (f) in FIG. 1A). The method for providing the users with a service may also be, for example, a method in which the service is supplied to the users after going through the cloud server 111 in the data-center operating company 110 again (as indicated by arrows (c) and (d) in FIG. 1A). The cloud server 111 in the data-center operating company 110 may also organize the log information into information that suits a service to be supplied to the users and supply the organized information to the service provider 120.

The users 10 and the users 20 may be different from each other or may be the same.

Embodiment

FIG. 6 is a block diagram illustrating the configuration of an air-conditioning control system in one embodiment of the present disclosure.

The air-conditioning control system includes an operation terminal 601, air-conditioning equipment 602, and a home-appliance control server 603. Some or all blocks in the home-appliance control server 603 belong to either the cloud server 111 in the data-center operating company 110 or the server 121 in the service provider 120.

The operation terminal 601, the air-conditioning equipment 602, and the home-appliance control server 603 are connected to each other through a predetermined network so as to allow communication. The predetermined network may be, for example, a public communication network including an internet communication network and a mobile-phone communication network. This, however, is merely one example. For example, when the home-appliance control server 603 is implemented by a home server placed in a home, the predetermined network may be a local area network (LAN). The LAN may be a wireless LAN, a wired LAN, or a LAN including both.

The operation terminal 601 displays, on a display, an air-conditioning setting screen (one example of a temperature setting screen) for operating the air-conditioning equipment 602, receives an operation for the air-conditioning equipment 602 from the user, and controls the air-conditioning equipment 602. More specifically, the operation terminal 601 includes a screen user interface (UI) control unit 611, an air-conditioning executing unit 612, a communication unit 613, an air-conditioning setting screen generating unit 614, a body-movement measuring unit 615, an air-conditioning setting information database (DB) 616, and a body-movement information DB 617. The operation terminal 601 may be implemented by, specifically, an information processing apparatus, such as a PC, a smartphone, or a tablet computer.

The screen UI control unit 611 has a display serving as an output device, a touch panel and a mouse (for input) serving as an input device, a processor for controlling the output device and the input device, and so on. The screen UI control unit 611 presents a user interface (an air-conditioning setting screen) for determining a control operation for the air-conditioning equipment 602. The screen UI control unit 611 displays, on the display, an air-conditioning setting screen generated by the air-conditioning setting screen generating unit 614 and outputs, to the air-conditioning setting screen generating unit 614, operational information indicating an operation that is input with the touch panel and/or the mouse. In accordance with the operation input by the user, the screen UI control unit 611 generates air-conditioning setting information for performing various settings on the air-conditioning equipment 602 and stores the generated air-conditioning setting information in the air-conditioning setting information DB 616.

By using the air-conditioning setting information DB 616 and the body-movement information DB 617 and in accordance with the operational information output from the screen UI control unit 611, the air-conditioning setting screen generating unit 614 generates an air-conditioning setting screen for the user to control the air-conditioning equipment 602 and instructs the screen UI control unit 611 to display the generated air-conditioning setting screen.

Operations of the air-conditioning setting screen generating unit 614 and the screen UI control unit 611 will be specifically described with reference to a screen view of the air-conditioning setting screen.

FIG. 7A illustrates an initial screen of the air-conditioning setting screen. The air-conditioning setting screen in FIG. 7A has a coordinate space in which the horizontal axis (hereinafter referred to as the "X-axis") specifies "time" items and a vertical axis (hereinafter referred to as the "Y-axis") specifies "temperature" items.

In the example in FIGS. 7A and 7B, items of time points are shown on the X-axis in the time period from 23:00 to 8:00 in increments of one hour. Items of temperatures are shown on the Y-axis in the temperature range of 25° C. to 29° C. in increments of one degree. An "OFF" item is shown at the uppermost position on the Y-axis. In the example in FIGS. 7A and 7B, item lines for the corresponding time-point items on the X-axis are rendered parallel to the Y-axis, and item lines for the corresponding temperature items on the Y-axis are rendered parallel to the X-axis. Operation points PT for the user to determine the set temperatures of the air-conditioning equipment 602 are further arranged on the item lines for the respective hourly time points. A position on the Y-axis which corresponds to the operation point PT arranged for the item of an hourly time point indicates the set temperature of the air-conditioning equipment 602 for that hourly time point. When the operation point PT is located at a position corresponding to the "OFF" item on the Y-axis, the air-conditioning equipment 602 is turned off. In the example in FIGS. 7A and 7B, nine operation points PT are arranged so as to correspond to the items of nine time points from 23:00 to 7:00.

As illustrated in FIG. 7B, when the screen UI control unit 611 detects a user operation of touching the operation point PT and dragging in the Y-axis direction (i.e., vertically), the air-conditioning setting screen generating unit 614 changes the display position of the operation point PT in accordance with the dragging amount. The screen UI control unit 611 determines that a temperature corresponding to the position on the Y-axis at which the operation point PT is displayed is the set temperature of the air-conditioning equipment 602 for the time point for which the operation point PT is arranged and generates air-conditioning setting information for causing the air-conditioning equipment 602 to operate at the set temperature at the corresponding time point.

In the example in FIG. 7B, the operation points PT for "23:00", "0:00", and "1:00" are positioned at the item "26° C.", the operation point PT for "2:00" is positioned at the item "27° C.", the operation points PT for "3:00" and "4:00" are positioned at the "OFF" item, and the operation points PT for "5:00", "6:00", and "7:00" are positioned at the item "28° C.". Thus, the air-conditioning equipment 602 is set such that the set temperature for 23:00 is 26° C., the set temperature for 0:00 is 26° C., the set temperature for 1:00 is 26° C., the set temperature for 2:00 is 27° C., the setting for 3:00 is OFF, the setting for 4:00 is OFF, the set temperature for 5:00 is 28° C., the set temperature for 6:00 is 28° C., and the set temperature for 7:00 is 28° C. When the screen UI control unit 611 detects a user operation of touching a start button SB (which is one example of a control start button) illustrated in FIG. 7A, the screen UI control unit 611 generates air-conditioning setting information in which the hourly set temperatures input by the user are reflected and registers the generated air-conditioning setting information in the air-conditioning setting information DB 616.

In the example in FIGS. 7A and 7B, time slots from 23:00 to 8:00 are shown on the X-axis. This is an arrangement considering the sleep time of the user. That is, in general, adults have a living pattern in which they start sleeping after 23:00 and wake up by 8:00. This, however, is merely one example. For example, the air-conditioning setting screen may be a screen on which time slots including 11 or more time-point items are arranged along the X-axis or may be a screen on which time slots including 10 or fewer time-point items are arranged along the X-axis.

The items of time points in time slots different from the time slots illustrated in FIGS. 7A and 7B may also be arranged on the X-axis in accordance with the living pattern of the user. Also, time slots in one day from 0:00 to 24:00 are arranged along the X-axis, and the screen UI control unit 611 limits the time slots displayed at a time to the time slots including 10 time points illustrated in FIGS. 7A and 7B. Thereafter, when a user operation for sliding the air-conditioning setting screen in a horizontal direction is input, the screen UI control unit 611 may cause the air-conditioning setting screen to scroll in the horizontal direction to display, on the display, an air-conditioning setting screen including other time slots. For example, when a user operation for sliding the display to the right is input, the screen UI control unit 611 causes the air-conditioning setting screen that is displayed to scroll to the left by a distance corresponding to the sliding amount. On the other hand, when a user operation for sliding the display to the left is input, the screen UI control unit 611 may also cause the air-conditioning setting screen that is displayed to scroll to the right by a distance corresponding to the sliding amount.

Although the above-description has been given of the operations of the air-conditioning setting screen generating unit 614 and the screen UI control unit 611, neither the air-conditioning setting information DB 616 nor the body-movement information DB 617 is reflected on the air-conditioning setting screen in the example illustrated in FIGS. 7A and 7B. A method for generating an air-conditioning setting screen on which those pieces of information are reflected is described later.

The air-conditioning setting information DB 616 is a database in which the air-conditioning setting information generated by the screen UI control unit 611 is accumulated. FIG. 8 is a table illustrating one example of the data structure of the air-conditioning setting information DB 616.

The air-conditioning setting information DB 616 is a database in which one piece of air-conditioning setting information is registered in each record, and has an "operation ID" field, an "equipment ID" field, an "execution time" field, an "execution-status flag" field, and an "operation instruction" field. In this case, one piece of air-conditioning setting information exists with respect to one time-point item illustrated in FIGS. 7A and 7B. Each "operation ID" is a unique identifier for identifying the corresponding air-conditioning setting information.

The "equipment ID" is a unique identifier given to the air-conditioning equipment 602 in advance in order to identify the air-conditioning equipment 602.

The "execution time" is the time point at which an operation instruction for the corresponding air-conditioning setting information is executed.

The "execution-status flag" indicates whether or not an operation instruction for the corresponding air-conditioning setting information has been executed. In the example in FIGS. 7A and 7B, when the operation instruction has been executed, the execution-status flag is set to "0x01", indicating that it has been executed, and when the operation instruction has not been executed, the execution-status flag is set to "0x00", indicating that it has not been executed.

The "operation instruction" includes an "operation status", an "operation mode", a "set temperature", a "blowing level", and a "blowing direction" and indicates details of an operation instruction on the air-conditioning equipment 602 indicated by the equipment ID.

The "operation status" indicates an operation for control on the air-conditioning equipment 602. For the air-conditioning equipment 602, the "operation status" has "0x01" indicating "ON" and "0x00" indicating "OFF". The operation status "ON" indicates an instruction for starting up the air-conditioning equipment 602, and the air-conditioning equipment 602 is started up by a control operation indicated by the parameters "operation mode", "set temperature", "blowing level", and "blowing direction". When the air-conditioning equipment 602 is already started up, the control operation "ON" indicates a continued operation, and the operation for control is changed with the parameters "operation mode", "set temperature", "blowing level", and "blowing direction". The operation status "OFF" indicates an instruction for stopping the air-conditioning equipment 602.

The "operation mode" indicates an operation mode of the air-conditioning equipment 602. For example, "0x01" indicates a cooling mode, "0x02" indicates a dehumidifying mode, and "0x03" indicates a heating mode.

The "set temperature" indicates a set temperature (Celsius) for the air-conditioning equipment 602. The "set temperature" is a set temperature that the user has input by operating the operation point PT.

The "blowing level" indicates the amount of air blown out by the air-conditioning equipment 602. For example, "0x01" indicates that the blowing level is automatically set, "0x02" indicates that the blowing level is set to "low", and "0x03" indicates that the blowing level is set to "high".

The "blowing direction" indicates the direction in which the air-conditioning equipment 602 blows out air. For example, "0x01" indicates that the blowing direction is automatically set, "0x02" indicates the blowing direction is set to "upward", and "0x03" indicates that the blowing direction is set to "downward".

Referring back to FIG. 6, the air-conditioning executing unit 612 refers to the air-conditioning setting information DB 616, and when the execution time specified by unprocessed air-conditioning setting information arrives, the air-conditioning executing unit 612 causes the air-conditioning equipment 602 to execute an operation instruction indicated by the air-conditioning setting information. More specifically, the air-conditioning executing unit 612 has a timer, and when the current time clocked by the timer reaches the execution time in the air-conditioning setting information for which the execution-status flag indicates that it is unprocessed, the air-conditioning executing unit 612 uses the communication unit 613 to transmit, to the air-conditioning equipment 602 via the home-appliance control server 603, an operation instruction corresponding to the corresponding air-conditioning setting information and addressed to the equipment ID of the corresponding air-conditioning equipment 602. When the air-conditioning equipment 602 completes the execution of the corresponding operation instruction, the air-conditioning executing unit 612 changes the "execution-status flag" to "done" in the corresponding air-conditioning setting information to thereby update the air-conditioning setting information DB 616.

In this case, an arrangement in which the operation terminal 601 receives, via the home-appliance control server 603, a completion notification indicating that the air-conditioning executing unit 612 has executed the operation instruction may be employed. In such a case, when the operation terminal 601 receives the completion notification, the air-conditioning equipment 602 may determine that the operation instruction has been executed and then update the execution-status flag to "done". Alternatively, the air-conditioning executing unit 612 may update the execution-status flag to "done" at the point when the operation instruction is transmitted, assuming that the operation instruction has been executed.

Although a scheme in which the operation terminal 601 controls the air-conditioning equipment 602 via the home-appliance control server 603 has been described in this case, the present disclosure is not limited thereto, and the operation terminal 601 may also transmit the operation instruction to the air-conditioning equipment 602 directly.

The communication unit 613 is implemented by a communication device that allows the operation terminal 601 to connect to a network in accordance with a protocol, such as Transmission Control Protocol/Internet Protocol (TCP/IP), and allows the operation terminal 601 to communicate with the home-appliance control server 603.

The body-movement measuring unit 615 uses an acceleration sensor included in the operation terminal 601 to measure the movement of the user's body (hereinafter referred to as "body movement"). In the present disclosure, the body-movement measuring unit 615 measures particularly the body movement of the user while sleeping. As a premise for performing the measurement, it is assumed that the operation terminal 601 is placed near the pillow of the user who is sleeping. Alternatively, the operation terminal 601 may be mounted on the user's body. Alternatively, the user may wear a wristband having an acceleration sensor so that information resulting from measurement performed by the acceleration sensor through proximity wireless communication based on Bluetooth or the like is transmitted from the wristband to the operation terminal 601 to thereby allow the body-movement measuring unit 615 to measure the body-movement value.

In this case, the body-movement measuring unit 615 determines a body-movement value at certain intervals of measurement time $\Delta T$ (e.g., once every 5 minutes) and records the determined body-movement value in the body-movement information DB 617 as body-movement information.

Acceleration measured by the acceleration sensor includes three acceleration components X, Y, and Z (m/s^2). Thus, the body-movement measuring unit 615 may determine a representative value (e.g., an average value, a maximum value, a minimum value, or an intermediate value) of the three acceleration components as the magnitude of the acceleration and then determine a body-movement value based on the magnitude of the acceleration. The acceleration sensor also measures acceleration at certain intervals $\Delta t$ (e.g., 10 seconds) that are shorter than the measurement time $\Delta T$. Thus, the body-movement value may be a maximum value of the amount of change in the acceleration within the measurement time $\Delta T$, may be a maximum value of the magnitudes of the acceleration within the measurement time $\Delta T$, may be a total value of the magnitudes of the acceleration within the measurement time $\Delta T$, or an average value of the magnitudes of the acceleration within the measurement time $\Delta T$.

Figures 9A, 9B:
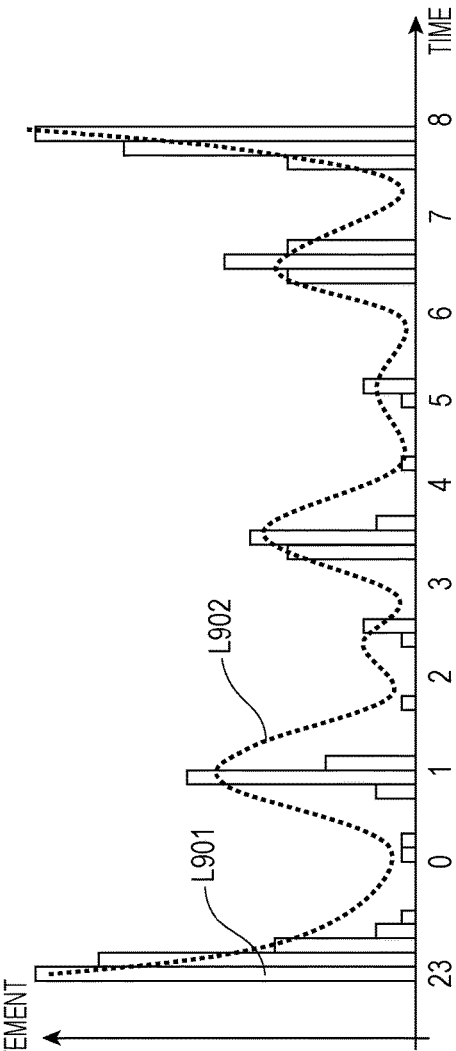
FIG. 9A is a table illustrating one example of the data structure of the body-movement information DB in the embodiment of the present disclosure.
FIG. 9B is a graph depicting values in the body-movement information DB.

The body-movement information DB 617 is a database for storing the body-movement information measured by the body-movement measuring unit 615. FIG. 9A illustrates one example of the data structure of the body-movement information DB 617. The body-movement information DB 617 is a database in which one piece of body-movement information is stored in each record, and has a "body-movement ID" field, a "measurement start time" field, a "measurement time" field, and a "value" field. The "body-movement ID" indicates an identifier for identifying the corresponding body-movement information. The "measurement start time" indicates the time point at which measurement of a body-movement value is started. The "measurement time" indicates the measurement time $\Delta T$ of the body-movement value. The "value" indicates a measured body-movement value. In this example, the body-movement value is a maximum value of the amounts of change in the magnitude of the acceleration within the measurement time $\Delta T$.

In FIG. 9B, the "values" in the body-movement information DB 617 are represented in the form of a bar graph L901 in a coordinate space in which the vertical axis indicates the body-movement value and the horizontal axis indicates time. A curve L902 denoted by a dotted line is a curve obtained by time-sequentially connecting the body-movement values indicated by the bar graph L901 and executing filter processing using a filter, such as a low-pass filter or a high-pass filter. As can be seen from the bar graph L901 and the curve L902, at about 23:00, the user has not completely fallen asleep since he or she has just begun sleeping, and thus the body-movement values exhibit large values. It can also be seen that the body-movement values have a large peak and a small peak that alternately and repeatedly appear at approximately regular time intervals. This is because light sleep and deep sleep are alternately repeated. Also, when the time reaches 8:00, the body-movement value increases greatly, which indicates that the user has woken up.

The description thus far has been given of the operation terminal 601.

The home-appliance control server 603 includes an equipment control unit 631 and an equipment management DB 632. The equipment control unit 631 includes, for example, a processor and a communication device that causes the home-appliance control server 603 to communicate with the operation terminal 601. The equipment management DB 632 includes a storage device and a processor that controls the storage device. The storage device is, for example, a rewritable nonvolatile storage device, such as a hard-disk drive or a solid state drive (SSD).

Upon receiving an operation instruction from the operation terminal 601, the equipment control unit 631 refers to the equipment management DB 632 by using the equipment ID as a search key to thereby identify the air-conditioning equipment 602 to which the operation instruction is to be transmitted and then transmits the operation instruction to the identified air-conditioning equipment 602. The format of the operation instruction for the air-conditioning equipment 602 may be a format that complies with a standard supported by the air-conditioning equipment 602, for example, a format that complies with the ECHONET Lite standard.

The equipment management DB 632 is a database in which equipment management information for the air-conditioning equipment 602 to which a service is supplied by the home-appliance control server 603 is registered. In the equipment management information, a unique "equipment ID" for identifying the air-conditioning equipment 602 and information for the home-appliance control server 603 to perform communication access to the air-conditioning equipment 602 are associated with each other. Examples of the information for the communication access include an IP address and a uniform resource locator (URL) on the Internet which are allocated to the air-conditioning equipment 602. When the air-conditioning equipment 602 communicates with the home-appliance control server 603 via a gateway, a URL or an IP address of the gateway is used as the information for the communication access. In any case, the information for the communication access may be any information with which the home-appliance control server 603 can communicate with the air-conditioning equipment 602 through a network, such as the Internet.

The description thus far has been given of the home-appliance control server 603.

The air-conditioning equipment 602 has a communication unit 621 and an air-conditioning control unit 622.

The communication unit 621 is implemented by a communication device that causes the air-conditioning equipment 602 to connect to the network in accordance with a protocol, such as TCP/IP, and causes the air-conditioning equipment 602 to communicate with the home-appliance control server 603.

The air-conditioning control unit 622 serves as a control mechanism for adjusting the air temperature, the humidity, and so on in a room where the air-conditioning equipment 602 is installed. More specifically, the air-conditioning control unit 622 is implemented by, for example, a microcontroller for realizing an air-conditioning function of an air conditioner. The air-conditioning control unit 622, however, may take any form, as long as it serves as a control mechanism that can control the temperature and the humidity in a room.

The description thus far has been given of the air-conditioning equipment 602.

Now, a description will be given of a generation method for the air-conditioning setting screen generating unit 614 to generate an air-conditioning setting screen by referring to the air-conditioning setting information DB 616 and the body-movement information DB 617.

FIGS. 10A and 10B illustrate examples of an air-conditioning setting screen on which the air-conditioning setting information and the body-movement information are reflected.

In the example in FIG. 10A, images in which changes in a previous day's body-movement values accumulated in the body-movement information DB 617 are shown in a time series are used as background images of the air-conditioning setting screen illustrated in FIGS. 7A and 7B. In FIGS. 10A and 10B, in a coordinate space defined by a Y-axis along which temperature items are indicated in increments of one degree and an X-axis along which time-point items are indicated in increments of one hour, operation points PT corresponding to the time-point items are arranged, as in FIGS. 7A and 7B.

The air-conditioning setting screen generating unit 614 generates background images of the air-conditioning setting screen showing time-series changes in the previous day's body-movement values such that the density of the background color is higher for times at which the body-movement value is larger and the density of the background color is lower for times at which the body-movement value is smaller. In this case, the body-movement values are shown in gradation in stripes parallel to the Y-axis such that the density of gray is increased for times at which the body-movement value is larger than a predetermined threshold and the color is white for times at which the body-movement value is smaller than or equal to the predetermined threshold. This, however, is merely one example, and the body-movement values may be shown in gradation without use of the threshold such that the density of the background color increases as the body-movement value increases and the density of the background color decreases as the body-movement value decreases. The "high density of the background color" refers to a color that is low in lightness and that is close to black, and the "low density of the background color" refers to a color that is high in lightness and that is close to white.

In the example illustrated in FIG. 10A, it can be seen that the body movements are large at about 1:00, 4:00, and 7:00 and the body movements are small at about 0:00, 2:00, and 5:00.

With such an arrangement, when performing temperature setting of the air-conditioning equipment 602, the user can easily understand the previous day's time slots in which the body-movements are large and can easily perform temperature setting of the air-conditioning equipment 602 by taking the body-movement values into account. For example, this allows the user to intuitively perform temperature setting involving determining that he or she had experienced restlessness at about 1:00 when the body-movement was large and reducing the set temperature for that time point.

In this case, the air-conditioning setting screen generating unit 614 may employ positions indicating the set temperatures of the previous day, which is the same date as that for the body-movement values, as the default display positions of the operation points PT. Such an arrangement allows the user to easily compare the previous day's set temperatures with the body-movement values, thereby clarifying the point at which the set temperature is to be adjusted. For example, when the air-conditioning setting screen in FIG. 10A is assumed to be the current day's default air-conditioning setting screen on which the previous day's body-movement values are shown in gradation as background images, the set temperature for 1:00 is set relatively high although the body-movement value at about 1:00 yesterday was large. Accordingly, the user can decide that the set temperature for 1:00 should be set relatively low for the current day. As described above, according to the present disclosure, clear decision material used for changing the set temperatures can be presented to the user.

The background images showing the previous day's body-movement values may be images in which the body-movement values are represented in a binary manner so as to color only the time periods in which the body-movement values exceed a certain threshold, as illustrated in FIG. 10B, rather than images in which the body-movement values are shown in gradation, like that illustrated in FIG. 10A. Such an arrangement also offers substantially the same advantages as those of the gradation display. For example, in FIG. 10B, since the body-movement values in the time slot from about 0:30 to 1:50 exceeded the threshold, an area representing this time slot and parallel to the Y-axis is colored (e.g., in black or gray). On the other hand, in the time slot from 1:50 to 3:10, since the body-movement values were smaller than or equal to the threshold, this time slot is not colored. Although the time slots in which the body-movement values exceed the threshold have been described as being colored in FIG. 10B, any display view may also be employed as long as they can be distinguished from the time slots in which the body-movement values are smaller than the threshold.

The description thus far has been given of the air-conditioning control system according to the present disclosure.

The home-appliance control server 603 may have one or more of the functions of the operation terminal 601. For example, the air-conditioning setting information DB 616, the body-movement information DB 617, and so on may be provided in the home-appliance control server 603 so as to allow the operation terminal 601 to obtain the air-conditioning setting information DB 616 and the body-movement information DB 617 from the home-appliance control server 603 through the network. For example, the air-conditioning executing unit 612 may also be provided in the home-appliance control server 603. With such a configuration, it is possible to reduce the load on the operation terminal 601.

The body-movement measurement function of the operation terminal 601 may be provided in another terminal, in which case body-movement information measured by the other terminal is accumulated in the home-appliance control server 603. Then, the home-appliance control server 603 may transmit the accumulated body-movement information to the operation terminal 601 through the network, as appropriate. This arrangement can also realize the same thing.

One or some of the functions of the home-appliance control server 603 may be provided in the operation terminal 601. For example, the operation terminal 601 may identify the air-conditioning equipment 602 and directly transmit a control command to the air-conditioning equipment 602.

Figures 11A, 11B:
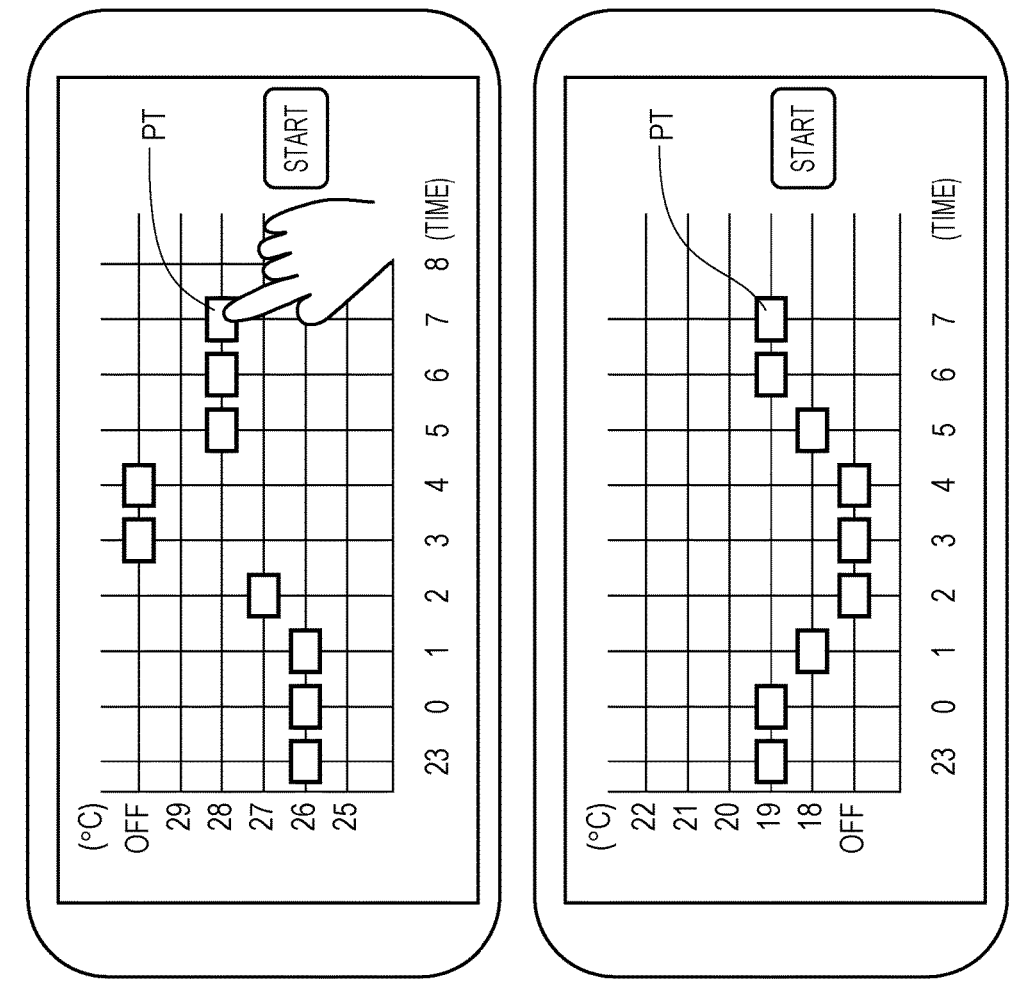
FIGS. 11A and 11B each illustrate an air-conditioning setting screen on which the position of an "OFF" item is changed in accordance with an operation mode of air-conditioning equipment in the embodiment of the present disclosure.

FIGS. 11A and 11B each illustrate an air-conditioning setting screen on which the position of the "OFF" item is changed in accordance with the operation mode of the air-conditioning equipment 602. When the air-conditioning equipment 602 is to be operated in the cooling mode, the "OFF" item is arranged at the uppermost position on the Y-axis, as illustrated in FIG. 11A. On the other hand, when the air-conditioning equipment 602 is to be executed in the heating mode, the "OFF" item is arranged at the lower position on the Y-axis, as illustrated in FIG. 11B. When the air-conditioning equipment 602 is turned OFF in the cooling mode, this leads to an increase in the room temperature. Thus, when the "OFF" item is placed above the temperature items on the Y-axis, the transition of changes in the room temperature becomes comprehensible to the user, thus allowing the user to perform an intuitive operation. On the other hand, when the air-conditioning equipment 602 is turned OFF in the heating mode, this leads to a decrease in the room temperature. Thus, when the "OFF" item is placed below the temperature items on the Y-axis, the transition of changes in the room temperature becomes comprehensible to the user, thus allowing the user to perform an intuitive operation. The display position of the "OFF" item may also be changed according to the date and time of use, rather than the air-conditioning setting screen being changed according to the operation modes, such as the heating mode and the cooling mode. For example, since the weather from May to October is relatively mild or warm, the room temperature increases in many cases, when the air-conditioning equipment 602 is turned OFF. Thus, in the period from May to October, the "OFF" item may be displayed above the temperature items. On the other hand, since the weather from November to April is relatively cool or cold, the room temperature decreases in many cases, when the air-conditioning equipment 602 is turned OFF. Thus, in the period from November to April, the "OFF" item may be displayed below the temperature items.

Alternatively, the display position of the "OFF" item may be changed according to the room temperature, the outdoor temperature, or the measurement result of an illuminance sensor at the time when the temperature of the air-conditioning equipment 602 is set using the air-conditioning setting screen. For example, when the room temperature is higher than a certain temperature, the "OFF" item may be displayed above the temperature items, and when the room temperature is lower than or equal to the certain temperature, the "OFF" item may be displayed below the temperature items.

Alternatively, the display position of the "OFF" item may also be changed according to the weather forecast information at the time when the temperature of the air-conditioning equipment 602 is set using the air-conditioning setting screen. In this case, the weather forecast information may be the atmospheric temperature in a region where the air-conditioning equipment 602 is installed. For example, when the temperature indicated by the weather forecast is higher than a certain temperature, the "OFF" item may be displayed above the temperature items, and when the temperature indicated by the weather forecast is lower than or equal to the certain temperature, the "OFF" item may be displayed below the temperature items.

Figure 12A:
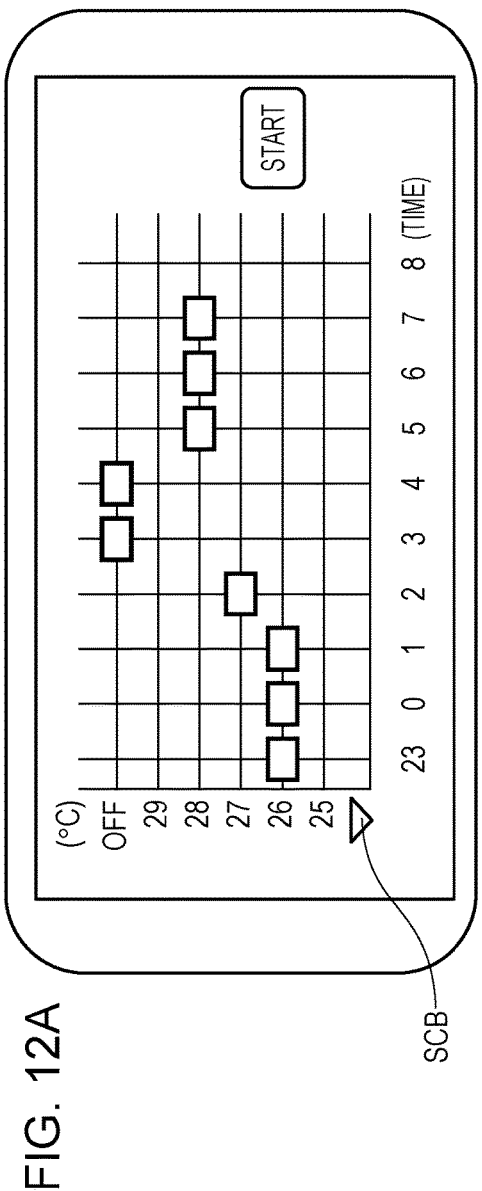
FIGS. 12A and 12B each illustrate an air-conditioning setting screen on which a scroll button is provided in the embodiment of the present disclosure.
Figure 12B:
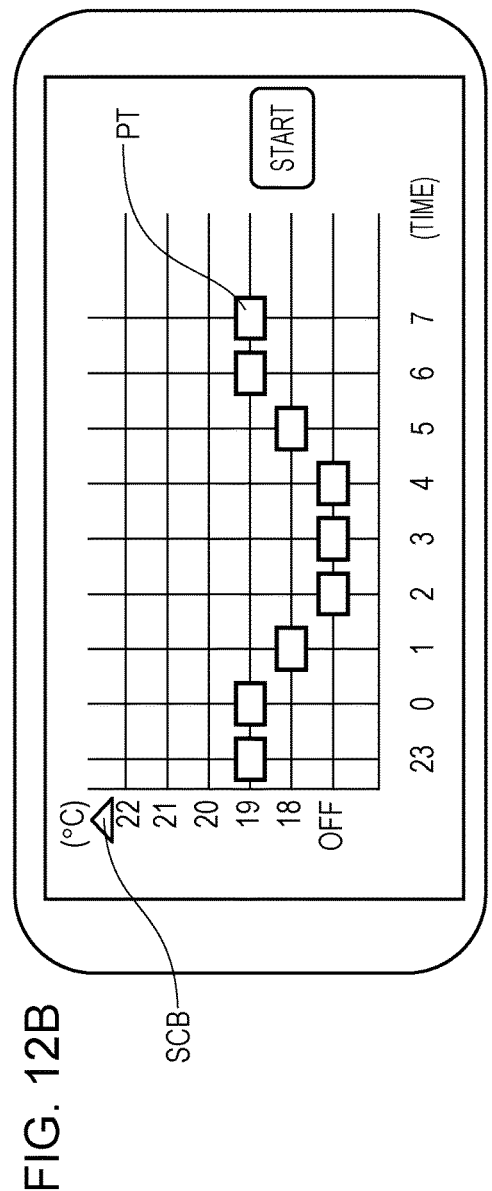

FIGS. 12A and 12B each illustrate an air-conditioning setting screens on which a scroll button SCB is provided. FIG. 12A illustrates the air-conditioning setting screen on which the "OFF" item arranged at the upper position on the Y-axis is displayed, and FIG. 12B illustrates the air-conditioning setting screen on which the "OFF" item arranged at the lower position on the Y-axis is displayed.

The scroll button SCB is provided on the air-conditioning setting screen illustrated in FIGS. 12A and 12B, and when the scroll button SCB is pressed, the air-conditioning setting screen that is displayed is scrolled in the Y-axis direction. For example, on the air-conditioning setting screen in FIG. 12A, a scroll button SCB pointing downward is displayed at a lower position on the Y-axis. When the scroll button SCB pointing downward is pressed, the air-conditioning setting screen is scrolled upward, so that the air-conditioning setting screen illustrated in FIG. 12B is displayed. On the other hand, on the air-conditioning setting screen illustrated in FIG. 12B, a scroll button SCB pointing upward is displayed at an upper position on the Y-axis. When the scroll button SCB pointing upward is pressed, the air-conditioning setting screen is scrolled downward, so that the air-conditioning setting screen illustrated in FIG. 12A is displayed.

When such a scroll display function is provided on the air-conditioning setting screen, as in FIGS. 12A and 12B, the entire temperature range arranged on the Y-axis is not simultaneously displayed, so that both of the "OFF" items are not simultaneously displayed on the display. With such an arrangement, when the user sets the air-conditioning equipment 602 to OFF while performing temperature setting for the higher temperature side illustrated in FIG. 12A, he or she selects the "OFF" item displayed at the upper position on the Y-axis. On the other hand, when the user sets the air-conditioning equipment 602 to OFF while performing temperature setting for the lower temperature side illustrated in FIG. 12B, he or she selects the "OFF" item displayed at the lower position on the Y-axis. Thus, the air-conditioning setting screen generating unit 614 allows the user to perform the task of setting the air-conditioning equipment 602 to OFF in a natural sense of operation, depending on whether or not the temperature being set is at the higher temperature side or the lower temperature side, without switching what is displayed on the air-conditioning setting screen in accordance with the operation mode.

When the air-conditioning setting screen on which the scroll button SCB is shown on the Y-axis is used, the temperature items shown on the Y-axis by default may also be changed in accordance with the operation mode. For example, when the temperature setting for the cooling mode is to be performed, the items of relatively high temperatures (e.g., 24 to 30° C.) may be shown on the Y-axis, and when the temperature setting for the heating mode is to be performed, the items of relatively low temperatures (e.g., 18 to 23° C.) may be shown on the Y-axis. The temperature items to be displayed may also be changed depending on the date and time of use. For example, in the period from May to October, the items of relatively high temperatures (e.g., 24 to 30° C.) may be shown on the Y-axis, and in the period from November to April, the items of relatively low temperatures (e.g., 18 to 23° C.) may be shown on the Y-axis. As described above, the temperature items shown on the Y-axis may be changed according to the room temperature, the outdoor temperature, or the measurement result from an illuminance sensor at the time when the air-conditioning setting screen is displayed. As described above, the temperature items shown on the Y-axis may also be changed according to the weather forecast information at the time when the air-conditioning setting screen is displayed.

The above description has been given of a case in which the previous set temperatures are used as the values of the default set temperatures on the air-conditioning setting screen. The present disclosure, however, is not limited to that example. For example, when the temperature setting using the air-conditioning setting screen has not yet been performed, the values of the default set temperatures may also be changed in accordance with the operation mode. For example, for the cooling mode, a relatively high temperature (e.g., 28° C.) or the like may be used as the default set temperatures, and for the heating mode, a relatively low temperature (e.g., 20° C.) or the like may be used as the default set temperatures. The set temperatures may also be changed depending on the date and time of use. For example, in the period from May to October, a relatively high temperature (e.g., 28° C.) may be used as the default set temperature(s), and in the period from November to April, a relatively low temperature (e.g., 20° C.) may be used as the default set temperature(s). In addition, as described above, the default set temperatures may also be changed according to the room temperature, the outdoor temperature, or the measurement result from an illuminance sensor at the time when the air-conditioning setting screen is displayed. Also, as described above, the default set temperatures may also be changed in accordance with the weather forecast information at the time of use.

Figure 23:
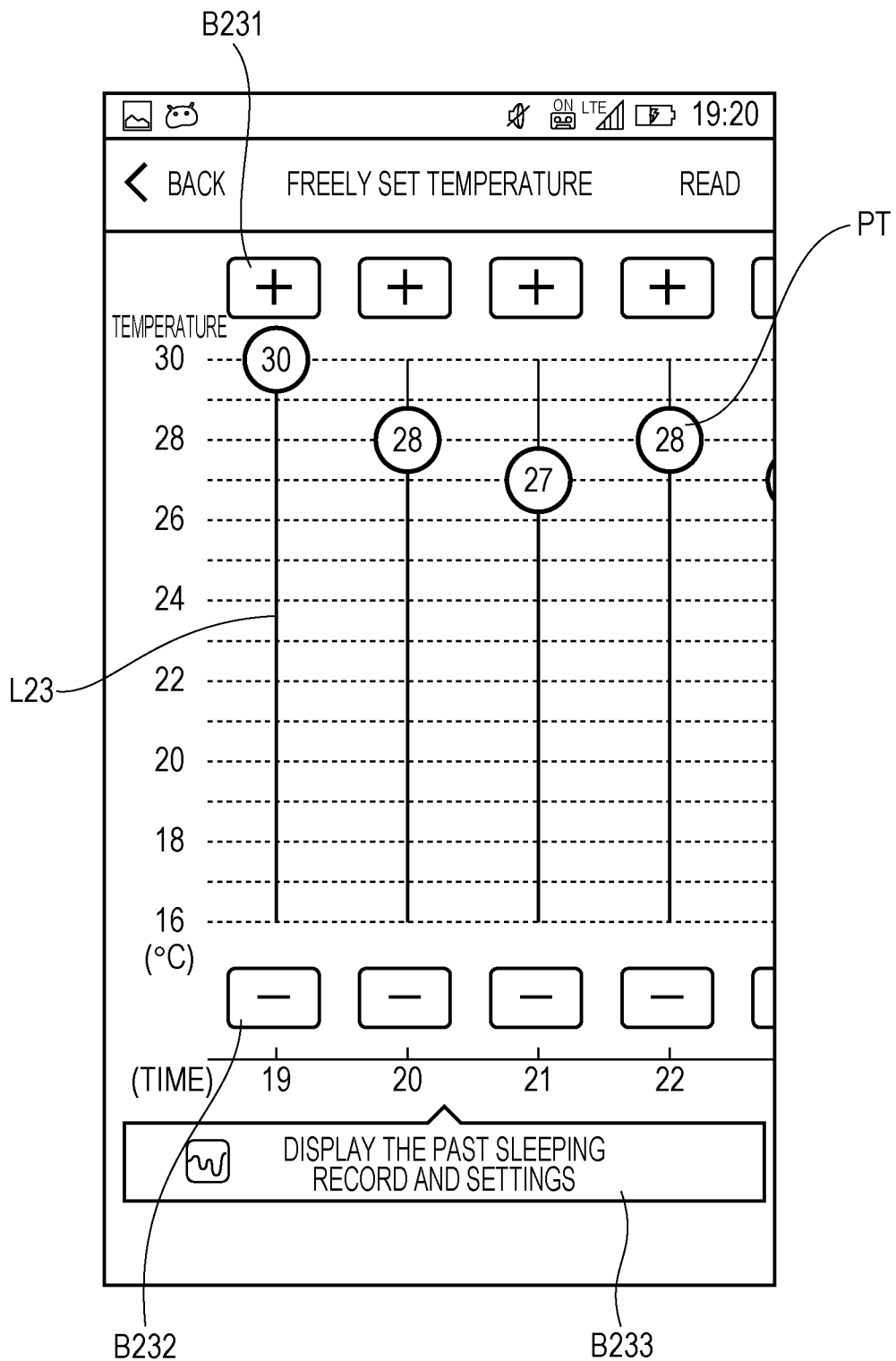
FIG. 23 illustrates another example of the air-conditioning setting screen in the embodiment of the present disclosure.
Figure 24:
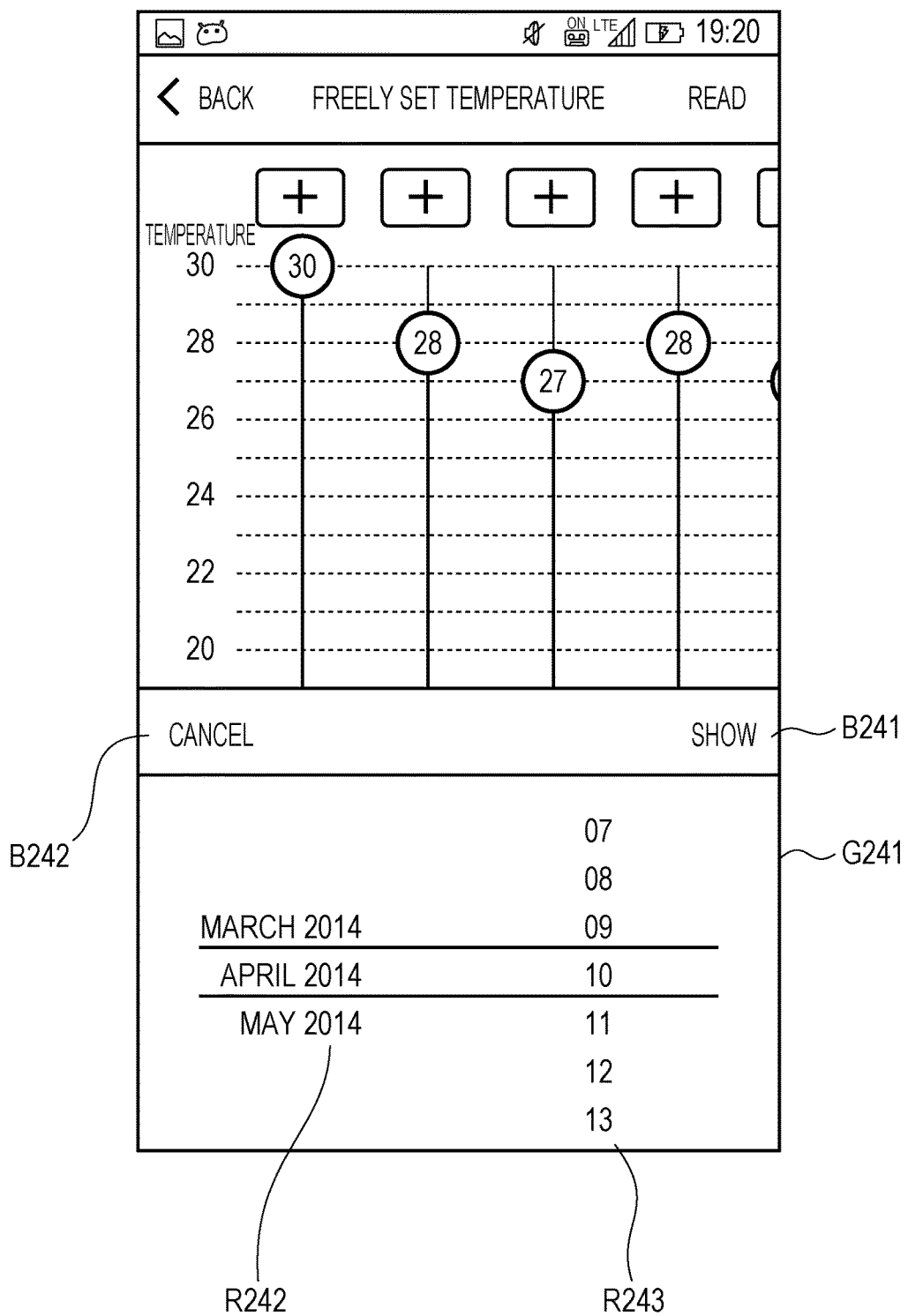
FIG. 24 illustrates another example of the air-conditioning setting screen in the embodiment of the present disclosure.
Figure 25:
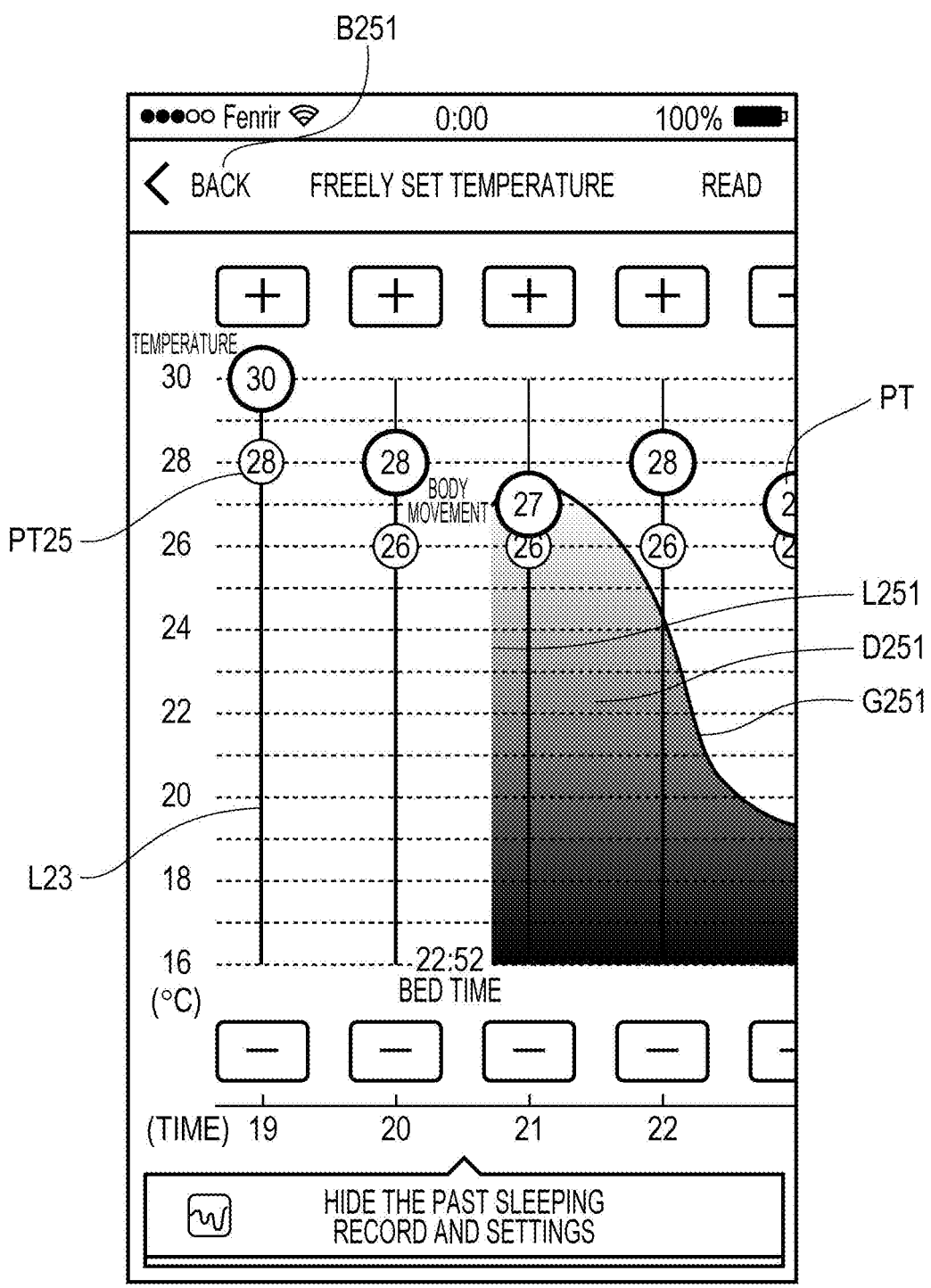
FIG. 25 illustrates another example of the air-conditioning setting screen in the embodiment of the present disclosure.

Although the air-conditioning setting screen illustrated in FIG. 10A is used as the air-conditioning setting screen on which the body-movement values are shown in gradation, the present disclosure is not limited thereto. For example, air-conditioning setting screens illustrated in FIGS. 23 to 25 may also be used. FIGS. 23 to 25 illustrate other examples of the air-conditioning setting screen according to the present embodiment.

FIG. 23 illustrates a default air-conditioning setting screen. This air-conditioning setting screen is the same as the example in FIGS. 7A and 7B in that operation points PT are arranged in a coordinate space in which temperature items are arranged along the Y-axis and time-point items are arranged along the X-axis. However, on the air-conditioning setting screen illustrated in FIG. 23, pairs composed of sliders B231 and B232 for sliding the corresponding operation points PT are provided at opposite ends of corresponding item lines L23 for respective hourly time points. Each slider B231 is a button provided at an upper end of the item line L23 and is used to slide the corresponding operation point PT upward. Each slider B232 is a button provided at a lower end of the item line L23 and is used to slide the corresponding operation point PT downward. The user can operate the operation points PT by using the sliders B231 and B232 or can also directly operate the operation points PT.

For example, when the user touches the slider B231, the air-conditioning setting screen generating unit 614 slides the corresponding operation point PT upward along the item line L23 at a certain speed while the slider B231 is touched. On the other hand, when the user touches the slider B232, the air-conditioning setting screen generating unit 614 slides the corresponding operation point PT downward along the item line L23 at a constant speed while the slider B232 is touched.

Each operation point PT has a circular outline within which the current set temperature is displayed. For example, since the current set temperature for the operation point PT for 19:00 is 30° C., the operation point PT for 19:00 is displayed as "30" within the outline.

Also, the items of 24 time points from 0:00 to 23:00 in increments of one hour are arranged along the X-axis on the air-conditioning setting screen illustrated in FIG. 23. However, when 24 time-point items are simultaneously displayed on the display, the air-conditioning setting screen is displayed with a reduced size, thereby making the user operation difficult, and thus, in the example in FIG. 23, the number of time-point items that are simultaneously displayed is set to four. Although four time-point items are displayed in FIG. 23, this is merely one example. The number of time-point items simultaneously displayed may be five or larger or three or smaller or may be any preferable number according to the size of the display.

When a user operation for sliding the display is input, the screen UI control unit 611 causes the air-conditioning setting screen that is displayed to scroll to the left or right in accordance with the sliding amount. As a result, when the time-point item for which the user desires to perform temperature setting is not displayed on the display, he or she performs an input operation for sliding the display to cause the time-point item to be displayed on the display and then can set the temperature for that time point. More specifically, when a user operation for sliding the display to the right is input, the screen UI control unit 611 causes the air-conditioning setting screen to scroll to the left, and when a user operation for sliding the display to the left is input, the screen UI control unit 611 causes the air-conditioning setting screen to scroll to the right.

A display instruction button B233 stating "Display the past sleeping record and settings" is arranged at a lower side of the air-conditioning setting screen. When the screen UI control unit 611 detects a touch on the display instruction button B233, the air-conditioning setting screen generating unit 614 causes a date selection screen G241 to be displayed in an area about one-third of and at a lower portion of the air-conditioning setting screen in an overlapping manner on the air-conditioning setting screen, as illustrated in FIG. 24. At this point, in order to prompt the user to pay attention to the date selection screen G241, the luminance of the area in which the date selection screen G241 is not displayed in an overlapping manner on the air-conditioning setting screen is reduced compared with the initial value.

The date selection screen G241 is a screen with which the user selects, from past body-movement values, the date for body-movement values he or she desires to display. The date selection screen G241 has a year-and-month selection section R242 and a date selection section R243. The year-and-month selection section R242 has, for example, a picker on which years and months are arranged in chronological order and years and months for three months are displayed at a time. The user vertically slides the year-and-month selection section R242 to rotate and display the year-and-month selection section R242 and locates a desired year and month at a selection position at the center thereof to thereby select the year and month.

The date selection section R243 has, for example, a picker on which dates in the selected year and month are arranged in chronological order and dates for seven days are displayed at a time. The user vertically slides the date selection section R243 to cause a desired date to be located at a selection position at the center of the date selection section R243 and selects the date.

After completing the selection of the year and month and the date, when the user touches a "show" button B241 arranged at an upper right of the date selection screen G241, the air-conditioning setting screen generating unit 614 shows an air-conditioning setting screen on which a background image showing the body-movement values for the selected date is displayed, as illustrated in FIG. 25.

On the other hand, when the user touches a "cancel" button B242 arranged at an upper left of the date selection screen G241, the air-conditioning setting screen generating unit 614 clears the date selection screen G241 to return the screen display to the air-conditioning setting screen illustrated in FIG. 23.

On the air-conditioning setting screen illustrated in FIG. 25, the body-movement values for the date selected by the user are displayed as a graph G251 in the form of a curve. The larger the body-movement value is, the higher the position on the graph G251 is. Also, the larger the body-movement value is, the higher the luminance with which the area inside the graph G251 is displayed is.

This graph G251 is created, for example, by connecting the body-movement values for the date that the user selected on the date selection screen G241 by using a spline curve. In the example in FIG. 25, since the time slots from 19:00 until after 22:00 are displayed, the graph G251 that is displayed shows changes in the body-movement value over time in these time slots.

Since the air-conditioning setting screen in FIG. 25 is intended so that the user performs temperature setting of the air-conditioning equipment 602 for the sleep time, the body-movement values in the time slots before the sleep time are not displayed. That is, in the example in FIG. 25, the body-movement values after 22:52, which is bed time, are displayed in the graph G251. In this case, the operation terminal 601 may determine, as the bed time, the time when the hourly temperature setting on the air-conditioning setting screen is finished and a control start button (not illustrated) for reflecting the temperature setting is touched, and then may store the determined time in the body-movement information DB 617. The operation terminal 601 may also start measuring the body-movement values upon being triggered by the user inputting with the control start button. In this case, when wake time arrives, the operation terminal 601 may stop measuring the body-movement values. The operation terminal 601 may determine, as the wake time, for example, the time for which the user set a wake-up alarm on the operation terminal 601. The above-described control start button (not illustrated) is displayed on the display when a user operation for switching the screen is input.

The description below is for a scheme for determining luminances in the area inside the graph G251. First, the air-conditioning setting screen generating unit 614 determines the area inside the graph G251 in the temperature-and-time coordinate space displayed on the air-conditioning setting screen. The term "area inside the graph G251" herein refers to the area surrounded by the graph G251 and the X-axis. In the example in FIG. 25, however, since the graph G251 is rendered for the time period from 22:52, which is the bed time, until the wake time, the area inside the graph G251 is an area D251 surrounded by a straight line L251 indicating the bed time and parallel to the Y-axis, the X-axis, the graph G251, and a straight line (not illustrated) indicating the wake time and parallel to the Y-axis.

Next, the air-conditioning setting screen generating unit 614 sets the luminances of horizontal lines, included in the area D251 and provided parallel to the X-axis, such that the luminances of the horizontal lines increase (i.e., such that the horizontal lines become brighter) as the body-movement value increases. In this case, values pre-defined according to the body-movement values may be used as the luminances of the horizontal lines parallel to the X-axis. The air-conditioning setting screen generating unit 614 renders an image in the area D251 with the set luminance of each horizontal line. As a result, as illustrated in FIG. 25, the area D251 is rendered such that the luminance is higher at higher positions in the area D251.

In the example in FIG. 25, in order to clearly show the contour of the area D251, the curve indicating the graph G251 is displayed in black.

The air-conditioning setting screen illustrated in FIG. 25 also displays setting points PT25 indicating hourly set temperatures of the air-conditioning equipment 602 for the date selected on the date selection screen G241. The setting points PT25 are arranged on the respective item lines L23 and have circular outlines slightly smaller than those of the operation points PT. Each setting point PT25 displays, within its outline, a numerical value indicating the set temperature and is arranged at a height position corresponding to the set temperature. Thus, the user can check at a glance the set temperatures for the selected date. Also, since the graph G251 indicating the body-movement values and the setting points PT25 indicating the set temperatures are simultaneously displayed for the selected date, the user can easily recognize appropriate set temperatures for the respective hourly time points, based on the relationships between the body-movement values and the set temperatures.

In addition, the setting points PT25 are displayed with lower luminance than the operation points PT so as to be less prominent than the operation points PT. This is aimed to prevent the user from confusing the operation points PT with the setting points PT25.

When a "back" button B251 displayed at the upper left of the screen illustrated in FIG. 25 is touched, the air-conditioning setting screen generating unit 614 switches the screen display to the air-conditioning setting screen illustrated in FIG. 23 or 24.

Although the air-conditioning setting screen that allows hourly temperature setting has been described in the present embodiment, the air-conditioning setting screen may also be an air-conditioning setting screen with which control items (e.g., a set humidity, a blowing level, and a blowing direction), other than the temperature, can be set for the air-conditioning equipment 602. For example, FIG. 13A illustrates an air-conditioning setting screen for setting the humidity of the air-conditioning equipment 602. FIG. 13B illustrates an air-conditioning setting screen for setting the blowing level of the air-conditioning equipment 602.

In FIG. 13A, the items of time points from 23:00 to 8:00 are shown on the X-axis in increments of one hour, and the items of humidities from 40% to 60% are shown on the Y-axis in increments of 5%. One operation point PT is provided on the item line for each hourly time point. The user vertically slides the operation point PT to locate the operation point PT to a height corresponding to a desired humidity. This allows the user to set the humidity of the air-conditioning equipment 602 for each hourly time point. Also, in FIG. 13A, an "OFF" item is displayed at the uppermost position on the Y-axis. Thus, by locating the operation point PT to the height of the "OFF" item, the user can set the humidity for the corresponding time point to OFF. Also, on the air-conditioning setting screen in FIG. 13A, a scroll button SCB is displayed at a lower position on the Y-axis. When the scroll button SCB is touched, the air-conditioning setting screen generating unit 614 causes the air-conditioning setting screen to scroll downward. As a result, the items of humidities lower than 40%, which items have not been displayed, are displayed on the display.

In FIG. 13B, the items of time points from 23:00 to 8:00 are shown on the X-axis in increments of one hour, and blowing levels are shown on the Y-axis in stages so that the blowing level increases the higher the position on the Y-axis is. In FIG. 13B, the blowing level for each time slot is represented by the height of gray cells. For example, in the time slot from 23:00 to 0:00, five cells from the bottom are displayed in gray, and thus the blowing level is set to "5". The user increases or reduces the number of gray cells to set the blowing level by touching the cell for a desired time slot with a contact object (e.g., his or her finger) and vertically sliding the contact object. By way of example, it is assumed that an area in three gray cells for the time slot from 0:00 to 1:00 is touched and the contact object is slid up to the fourth cell from the bottom. In this case, the fourth cell is also displayed in gray, and the blowing level for this time slot is increased from "3" to "4". On the other hand, it is assumed that the area in three gray cells for the time slot from 0:00 to 1:00 is touched with a contact object and the contact object is slid up to the second cell from the bottom. In this case, the third cell is displayed in white. As a result, the blowing level for this time slot is reduced from "3" to "2". In FIG. 13B, operation points PT may also be arranged so as to allow setting of the blowing level by increasing/reducing the number of operation points PT.

The above-described air-conditioning setting screens for the control items of the air-conditioning equipment 602 may also be displayed in a vertical arrangement with the items on the X-axis being synchronized with each other, rather than only one air-conditioning setting screen being displayed. For example, both of the air-conditioning setting screens illustrated in FIGS. 13A and 13B may also be displayed on the display in a vertical arrangement. In such a case, the user can set a plurality of control items without performing an input operation for switching the screen display.

Although the air-conditioning setting screen that allows hourly temperature setting has been described in the present embodiment, a screen UI that allows setting of sleep-related control items, other than for the air-conditioning equipment 602, may also be used. For example, when equipment for automatically opening/closing a window is installed in a home, a screen UI that allows setting of the time for opening/closing the window may also be used. Also, for example, when lighting equipment that allows light control is installed in a home, a screen UI that allows hourly setting of the amount of light control may also be used. In this case, the screen UI to be used may be, for example, a screen UI on which items of the amounts of light control are shown on the Y-axis, the items of time points are shown on the X-axis, and operation points PT are arranged for the respective items of the time points.

FIGS. 14A and 14B illustrate other examples of the air-conditioning setting screen. On the air-conditioning setting screen in FIG. 14A, the colors of the operation points PT are changed in accordance with the body-movement values, rather than displaying the body-movement values by using background images. In the example in FIG. 14A, for example, the previous day's body-movement values are shown by way of example, the operation points PT for the time slots in which the body-movement values are large are displayed in dark color, and the operation points PT for the time slots in which the body-movement values are small are displayed in light color. That is, in the example in FIG. 14A, the operation points PT are displayed such that the color becomes darker as the body-movement value increases and the color becomes lighter as the body-movement value decreases. Such an arrangement makes it easier for the user to understand for which time point the set temperature is to be changed to enhance comfort. Although an arrangement in which the operation points PT are displayed in darker color for a larger body-movement value has been described above, this is merely one example, and an arrangement in which the operation points PT are displayed in lighter color for a larger body-movement value may also be used. Also, an arrangement in which colors corresponding to the magnitudes of the body-movement values are pre-defined in stages and the operation points PT are displayed in colors corresponding to the magnitudes of the body-movement values may also be used. The "dark color" refers to color that is low in lightness and that is close to black, and the "light color" refers to color that is high in lightness and that is close to white. In the example in FIG. 14A, the color(s) of only the operation point(s) PT in the time slot(s) in which the body-movement value(s) is/are larger than a threshold may also be changed.

On the air-conditioning setting screen in FIG. 14B, the shapes of the operation points PT are changed in accordance with the body-movement values, rather than displaying the body-movement values by using background images. In the example in FIG. 14B, the previous day's body-movement values are shown by way of example, the operation point PT for a time slot in which the body-movement value is large is displayed with a large size, and the operation point PT for a time slot in which the body-movement value is small is displayed with a small size. That is, in the example in FIG. 14B, the operation points PT are displayed such that the operation point PT increases in size as the body-movement value increases and the operation point PT is reduced in size as the body-movement value decreases. Such an arrangement allows the user to easily recognize for which time point the set temperature is to be changed to enhance comfort. Although the operation points PT illustrated in FIGS. 14A and 14B have a quadrangular shape, this is merely one example, and the operation points PT may have any of various shapes, such as a triangular shape, a circular shape, a pentagonal shape, and a hexagonal shape. In the example in FIG. 14, the size(s) of only the operation point(s) PT in the time slot(s) in which the body-movement value is larger than the threshold may also be changed.

Figure 15A:
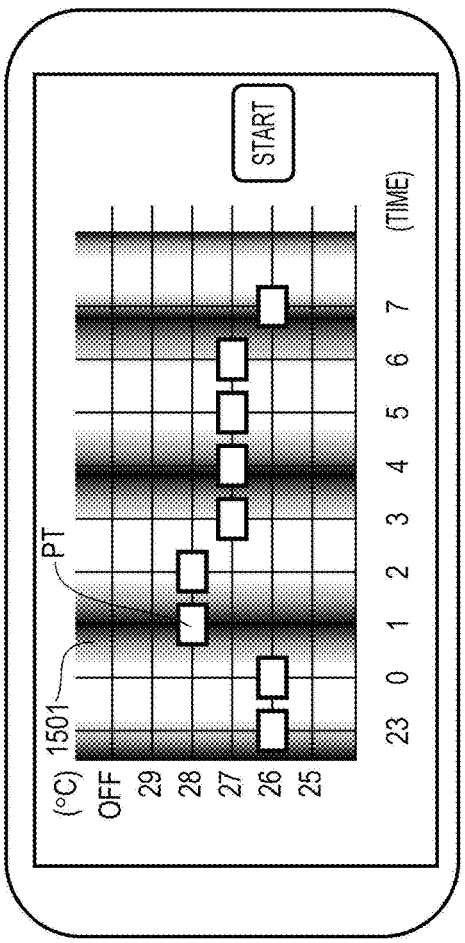
FIGS. 15A and 15B illustrate another example of the air-conditioning setting screen in the embodiment of the present disclosure.
Figure 15B:
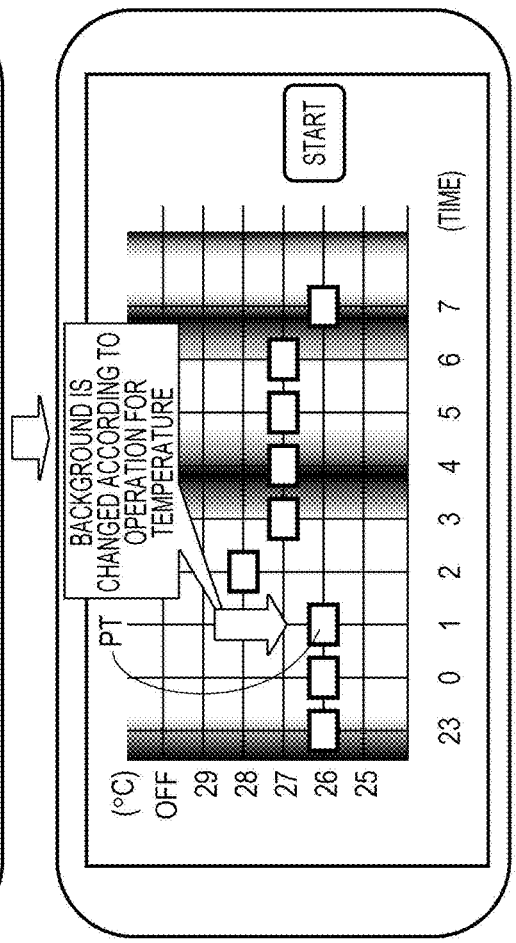

FIGS. 15A and 15B illustrate other examples of the air-conditioning setting screen. In FIGS. 15A and 15B, although the body-movement values are displayed as background images, similarly to FIGS. 10A and 10B, the display of the background images is changed in accordance with the type of temperature setting the user performs by using the operation points PT. In the example in FIG. 15A, the previous day's set temperatures are displayed as initial values. In FIG. 15B, the operation point PT for 1 a.m. is slid, so that the set temperature is reduced. In this case, for example, since the set temperature is changed, the image showing the body-movement value in the time slot including 1 a.m., which image was displayed as a background image, has been cleared. More specifically, an area 1501, which was shown in gradation in stripes centered on the time slot of 1 a.m. in FIG. 15A, is not displayed, as illustrated in FIG. 15B. The area 1501 is an area in which the body-movement values larger than the threshold continue along the time axis. With this arrangement, the user can easily distinguish between the time point for which the temperature setting has been finished and the time point for which the temperature setting has not been finished among the time points at which the body-movement values are larger than or equal to the threshold.

In this case, the area 1501 may also be undisplayed, for example, when the set temperature for the corresponding time point is set to a recommended temperature that is pre-determined by the air-conditioning control system. With this arrangement, on the basis of whether or not the area 1501 is displayed, the user can easily determine whether or not the set temperature for the corresponding time point has been set to a recommended temperature. In addition, since the area 1501 is hidden when a recommended temperature is set, the user can obtain a sense of accomplishment on the operation.

The use of the configuration illustrated in FIGS. 15A and 15B allows temperature settings recommended by the air-conditioning control system to be presented to the user through guidance. The color or size of each operation point PT, not the background image, may also be changed, as illustrated in FIGS. 14A and 14B, to present, to the user, information indicating whether or not the recommended temperature has been reached. For example, in FIG. 14A, when the operation point PT for a time point is operated and the set temperature is set to a recommended temperature, the color of the operation point PT may be changed to a predetermined color. The predetermined color may be a pre-defined color indicating that the set temperature has been set to a recommended temperature. In FIG. 14B, when the operation point PT for a time point is operated and the set temperature is set to a recommended temperature, the shape of the operation point PT may also be changed to a non-quadrangular shape, such as a triangular shape or a circular shape. This arrangement can provide the user with easy-to-understand guidance for a method for changing the set temperature.

FIGS. 16A and 16B illustrate other examples of the air-conditioning setting screen. In the air-conditioning setting screen in FIG. 16A, a graph 1601 showing changes in the past (e.g., the previous day's) body-movement value over time is displayed as a background image. This graph 1601 is similar to the graph G251 illustrated in FIG. 25. In this case, since the hourly temperature setting is also made possible by taking the magnitudes of the body-movement values into account, information indicating for which time point the temperature is to be changed can be presented to the user in a comprehensible manner.

Also, as illustrated in FIG. 16B, a message may also be displayed on the air-conditioning setting screen to notify the user of the operation point PT for the time point for which the set temperature is to be changed. In this case, the operation points PT for 1:00 and 2:00 are surrounded by a circle 1602, and a message 1603 with an arrow pointing at the circle 1602 is displayed. The message 1603 states "you may experience restlessness here". Such an arrangement makes it possible to clearly show to the user that which operation point PT is to be changed. The reason why the operation points PT for 1:00 and 2:00 have been selected as operation points PT for the time points for which the set temperature is to be changed is that, in the time slots of 1:00 and 2:00, the set temperatures are set relatively high even though the body-movement values are large.

Although the previous day's body-movement values have been shown in FIGS. 10A, 10B, 14A, 14B, 15A, 15B, 16A, 16B, and 25, the present disclosure is not limited thereto, and information obtained by modifying the past body-movement values, for example, an average value of the body-movement values of the past few or several days, may also be shown.

In addition, although the body-movement values have been used in FIGS. 10A, 10B, 14A, 14B, 15A, 15B, 16A, 16B, and 25 as information for changing the user interface on the air-conditioning setting screen (the information is hereinafter referred to as "UI change-source information"), the present disclosure is not limited thereto, and information described below may also be used. The description below will be given of an example of information that is useful as the UI change-source information.

The room temperature, the room humidity, the outdoor temperature, or the amount of change in any of these values may also be used as the UI change-source information. In this case, the air-conditioning equipment 602 has a sensor for measuring the room temperature, the room humidity, and/or the outdoor temperature. Then, the operation terminal 601 may obtain, through a network at regular time intervals, information that the air-conditioning equipment 602 obtains through measurement using the sensor and may accumulate the obtained information in a memory.

Such an arrangement offers the following advantages. When past room temperatures and outdoor temperatures are presented, the set temperature in a time slot in which the temperature is high or low can be presented in a comprehensive manner to the user as a point for which the setting is to be changed. Also, when the past room humidities are presented, the set temperature in a time slot in which the humidity is high or low can be presented in a comprehensive manner to the user as a point for which the setting is to be changed.

In a time slot in which changes in humidity are large, the possibility that the amount of perspiration is large is high. Thus, when time-series information of changes in humidity is presented, a time slot in which the user may have discomfort because of a large amount of perspiration can be presented to the user in a comprehensive manner. Instead of the past room temperature, the room humidity, or the outdoor temperature, a predicted value of the room temperature, the room humidity, or the outdoor temperature may also be used as the UI change-source information. In this case, based on the weather forecast information, the current outdoor temperature, or the like, the operation terminal 601 determines changes in a predicted outdoor temperature, a predicted room temperature, or a predicted room humidity when the temperature setting is not performed on the air-conditioning equipment 602. Thereafter, by using the changes in the predicted outdoor temperature, the predicted room temperature, or the predicted room humidity, the operation terminal 601 determines a room temperature or a room humidity when the air-conditioning equipment 602 is operated at the set temperature. With such an arrangement, the operation terminal 601 can present to the user the predicted value of the room temperature, the room humidity, or the outdoor temperature. A sensor that is independent from the air-conditioning equipment 602 may also measure the room temperature, the room humidity, or the outdoor temperature. In this case, the sensor may transmit information resulting from the measurement to the operation terminal 601 through the network.

The values of time-series changes in electricity cost may also be used as the UI change-source information. In this case, the air-conditioning equipment 602 may measure the amount of power consumed and the operation terminal 601 may obtain information resulting from the measurement through the network at regular time intervals and accumulate the information. With such an arrangement, since the time slot in which the electricity cost is high is presented to the user in a comprehensive manner, for which time slot the operation point PT is to be operated becomes comprehensible to the user.

FIG. 17A illustrates an air-conditioning setting screen when an electricity cost is used as the UI change-source information. For instance, the air-conditioning setting screen in FIG. 17A is one example in which the UI is changed, and the electricity costs in the previous day's time slots are represented in a bar graph 1701 in a background image. More specifically, electricity costs from 23:00 to 8:00 are shown in increments of one hour and are represented by the height in the Y-axis direction. This arrangement makes it possible to present the user with decision material with which, for example, in the cooling mode, the set temperature is set to relatively low in the time slot in which the electricity cost is low and the set temperature is set to relatively high in the time slot in which the electricity cost is high.

Also, merely the amounts of power consumed (kWh), instead of the electricity cost, may be displayed in the background image by using the bar graph 1701. This can also offer advantages that are similar to those in the case in which the electricity costs are displayed in the background image. Predicted values of electricity costs, not the past electricity costs, may also be used as the UI change-source information. In this case, based on the weather forecast information, the current outdoor temperature, or the like, the operation terminal 601 determines changes in a predicted outdoor temperature, a predicted room temperature, or a predicted room humidity when the temperature setting is not performed on the air-conditioning equipment 602. Then, by using the changes in the predicted outdoor temperature, the predicted room temperature, or the predicted room humidity, the operation terminal 601 determines the electricity cost when the air-conditioning equipment 602 is operated with the set temperature. Such an arrangement allows the operation terminal 601 to present to the user the predicted value of the electricity cost.

The values of time-series changes in the user's heart rate may also be used as the UI change-source information. In this case, a heart-rate measuring device for measuring the user's heart rate is additionally provided. This heart-rate measuring device then transmits information of the measured user's heart rate to the operation terminal 601 through the network at regular time intervals. A typical example of the heart-rate measuring device is a wristband type. In recent years, wristwatches having a built-in heart-rate measurement function have been commercially available. Thus, the heart-rate measuring device can easily be attached to the user's body.

FIG. 17B illustrates an air-conditioning setting screen when the heart rate is used as the UI change-source information. In the example in FIG. 17B, the heart rate versus time is shown using a line graph 1702. With such an arrangement, a time period in which the heart rate is irregular or the like is presented to the user in a comprehensive manner. Thus, decision material with which, for example, the set temperature in the time slot in which the heart rate is irregular is reduced in the cooling mode can be presented to the user, and for which time slot the operation point PT is to be operated can be presented to the user in a comprehensive manner.

A synchronization button 1703 is provided on the air-conditioning setting screen in FIG. 17B. When the user presses the synchronization button 1703, the operation terminal 601 changes the set temperatures of the air-conditioning equipment 602 at once so that they synchronize with changes in the heart rate. This allows the user to easily perform temperature setting according to changes in the heart rate. The "synchronizing the set temperatures with changes in the heart rate" means, for example, setting the set temperature of the air-conditioning equipment 602 to high for a higher heart rate and setting the set temperature of the air-conditioning equipment 602 to low for a lower heart rate.

The values of time-series changes in the sleep rhythm (REM sleep and non-REM sleep) may also be used as the UI change-source information. FIG. 19A illustrates a graph 1901 showing changes in the sleep rhythm over time. In FIG. 19A, the Y-axis represents the depth of sleep, and an upper position on the Y-axis indicates that the sleep is shallower; and the X-axis represents the time from the sleep onset time to the wake time.

As illustrated in FIG. 19A, during human sleep, non-REM sleep and REM sleep are repeated in a time series. Non-REM sleep refers to a state in which both the body and the brain are asleep and resting and is classified into four stages depending on the depth of sleep. A larger value of the stage indicates that the sleep is deeper. REM sleep refers to a state in which the body is asleep and resting and the brain is awake. REM is an acronym of rapid eye movement. When people sleep, first, they enter non-REM sleep in which both the body and the brain can rest. Then, after 60 to 90 minutes, the brain starts to work again and then enters REM sleep. Thereafter, the stage proceeds to non-REM sleep and enters REM sleep again. This pattern is repeated, and the brain and the body both wake up at the time of awakening.

The sleep rhythm may also be determined using the body-movement information resulting from the measurement performed by the operation terminal 601. Alternatively, a sleep rhythm measurement device for measuring the sleep rhythm of the user is additionally prepared. The sleep rhythm measurement device transmits information resulting from the measurement to the operation terminal 601 through the network at regular time intervals, so that the information is accumulated in the operation terminal 601.

Examples of a method for measuring the sleep rhythm include a method for measuring the brain wave of the user and a method for performing measurement based on the acceleration measured by a wristband type acceleration sensor worn by the user.

The operation terminal 601 then displays the air-conditioning setting screen on which the graph 1901 illustrated in FIG. 19A is shown as a background image. With such an arrangement, since information indicating in which time slot the sleep rhythm becomes irregular is presented to the user in a comprehensive manner, and thus for which time slot the operation point PT is to be operated is presented to the user in a comprehensive manner.

Time-series values of the body temperature may also be used as the UI change-source information. FIG. 19B illustrates a graph 1902 showing changes in the core body temperature over time. As illustrated in FIG. 19B, the human core body temperatures generally synchronize with a circadian rhythm, and is highest in the early evening and is lowest at dawn (at about 4 a.m.). When the core body temperature of the user is used as the UI change-source information, a body temperature measurement device for measuring the core body temperature of the user is additionally prepared. The body temperature measurement device transmits information resulting from the measurement to the operation terminal 601 through the network at regular time intervals. For example, the body temperature measurement device may be a thermometer of a type that is attached to the user's armpit. Such an arrangement makes it easier for the user to perform temperature setting according to his or her body temperature. For example, the operation terminal 601 may map the graph 1902, which indicates changes in the core body temperature over time, as a background image of the air-conditioning setting screen, as illustrated in FIG. 17B. Such an arrangement makes it easier to perform temperature setting of the air-conditioning equipment 602 so as to synchronize with changes in core body temperature. Through experiments and so on, it has been found that the human core body temperatures generally change in the same rhythm such that they are highest in the early evening and are lowest at dawn (at about 4 a.m.). Thus, the typical human core body temperatures may also be used as the UI change-source information. As illustrated in FIG. 17B, the synchronization button 1703 is arranged on the air-conditioning setting screen. When the user touches the synchronization button 1703, the operation terminal 601 changes the set temperatures of the air-conditioning equipment 602 at once so that they synchronize with changes in the core body temperature. This allows the user to easily perform temperature setting according to changes in the core body temperature. The "synchronizing the set temperatures with changes in the core body temperature" means, for example, in the cooling mode, setting the set temperature of the air-conditioning equipment 602 to a lower temperature as the core body temperature increases and setting the set temperature of the air-conditioning equipment 602 to a higher temperature as the core body temperature decreases.

Values (clear, cloudy, rain, temperature, and humidity) of weather forecast may also be used as the UI change-source information. When weather forecast information is used as the UI change-source information, the operation terminal 601 may access a server, which is provided on the Internet to provide weather forecast information, through the network to obtain the weather forecast information at regular time intervals. With such an arrangement, information indicating in which time slot the temperature and the humidity change is presented to the user in a comprehensive manner, thus making it easier to perform control setting of the air-conditioning equipment 602.

The respiration rate may also be used as the UI change-source information. When the respiration rate is used as the UI change-source information, a respiration measurement device for measuring the respiration rate is additionally prepared. The respiration measurement device transmits information resulting from the measurement to the operation terminal 601 through the network at regular time intervals. With such an arrangement, since the time slot in which breathing become irregular is presented to the user in a comprehensive manner, for which time slot the operation point PT is to be operated becomes comprehensible to the user.

The sound level of sleep-talking, snoring, or the like during sleep may also be used as the UI change-source information. When the sound level is used as the UI change-source information, the operation terminal 601 measures the sound level during sleep by utilizing a microphone function of the operation terminal 601. The operation terminal 601 then displays, as a background image of the air-conditioning setting screen, a graph showing changes in the sound level over time. With such an arrangement, for example, a time slot in which the sound level increased because of restlessness is presented to the user in a comprehensive manner. Thus, for which time slot the operation point PT is to be operated becomes comprehensible to the user.

Predicted Mean Vote (PMV), Predicted Percentage of Dissatisfied (PPD), and so on are available as comfort indices in a thermal environment. Such a qualitative comfort index may also be used as the UI change-source information. PMV is calculated according to an equation that uses a room temperature, a mean radiant temperature, a relative humidity, an average wind speed, the amount of clothing, and the amount of work as parameters. When a comfort index is used as the UI change-source information, a sensor included in the operation terminal 601 may measure the parameters. Alternatively, a sensor for measuring the parameters may be additionally provided. Information resulting from the measurement performed by the sensor is then sent to the operation terminal 601 at regular time intervals. The operation terminal 601 calculates PMV from the obtained information and displays, as a background image of the air-conditioning setting screen, a graph showing changes in PMV over time. With such an arrangement, since the time slot in which the user is not comfortable is presented to him or her in a comprehensible manner, for which time slot the operation point PT is to be operated becomes comprehensible to him or her.

For the air-conditioning setting screens illustrated in FIGS. 10A, 10B, 14A, 14B, 15A, 15B, 16A, 16B, and 25, a combination of the pieces of UI change-source information described above may also be used.

Figures 18A, 18B, 18C:
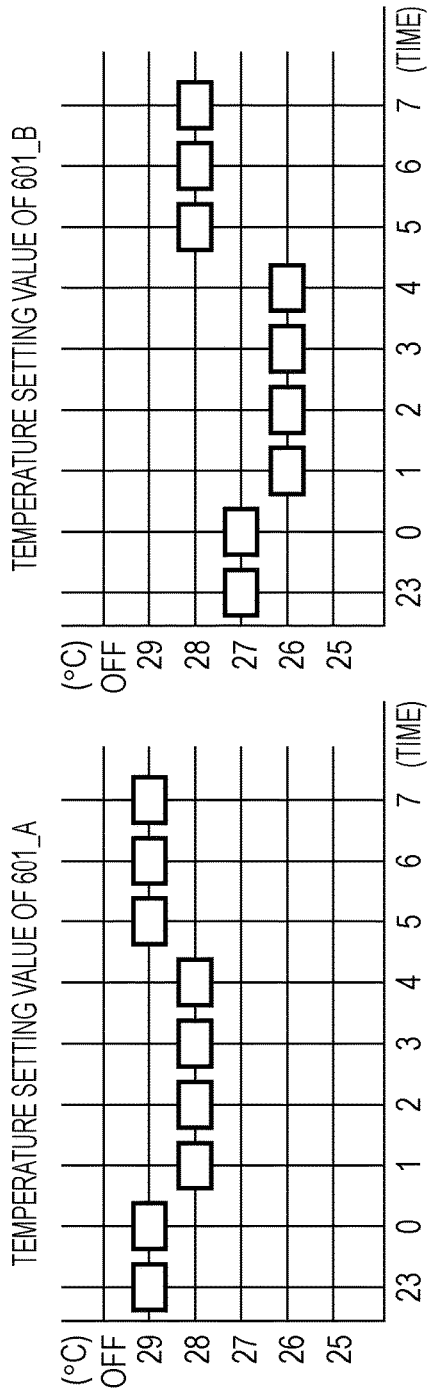
FIGS. 18A to 18C illustrate an adjustment method when a plurality of users perform temperature setting in the embodiment of the present disclosure.

In the air-conditioning system according to the present embodiment, when a plurality of users perform temperature setting with the operation terminal 601, the air-conditioning equipment 602 may also be controlled using an average value of set temperatures for each hourly time point. FIG. 18A illustrates set temperatures with an operation terminal 601_A, and FIG. 18B illustrates set temperatures with the operation terminal 601_B. In this case, final set temperatures of the air-conditioning equipment 602 are shown as in FIG. 18C. That is, in FIG. 18C, average values of the hourly set temperatures of the operation terminals 601_A and 601_B are set as final hourly set temperatures of the air-conditioning equipment 602. In this case, when a plurality of users are sleeping in the same room, it is possible to prevent the final set temperatures of the air-conditioning equipment 602 from becoming set temperatures biased for a particular user. When a plurality of users perform temperature setting with their operation terminals 601, priorities may be given to the respective operation terminals 601. When a plurality of users sleep in the same room, the priorities may be set considering a relationship between the users, their tolerances to the air-conditioning equipment 602, and so on. This makes it possible to perform temperature setting of the air-conditioning equipment 602 in which the relationship between the users and their tolerances to the air-conditioning equipment 602 are reflected.

In the air-conditioning control system according to the present embodiment, an operation sound of the air-conditioning equipment 602 during sleep may be controlled, as illustrated in FIG. 20. FIG. 20 illustrates a method for outputting an operation sound. An arrangement as illustrated in FIG. 20 may also be used in which an operation sound of the air-conditioning equipment 602 is output only at a timing when the hourly set temperatures set using the air-conditioning setting screen on the operation terminal 601 are transmitted to the home-appliance control server 603 (i.e., at a timing when the air-conditioning setting information is transmitted when the start button SB illustrated in FIGS. 7A and 7B is pressed) and is not output during sleep. For example, the air-conditioning equipment 602 may also be configured so as not to output an operation sound in time slots during sleep even when the air-conditioning equipment 602 receives an operation signal from the home-appliance control server 603 and makes changes to the control.

The "operation sound" as used herein refers to sound that the air-conditioning equipment 602 outputs to notify the user that an operation is received. The air-conditioning equipment 602 is generally adapted to output an operation sound, for example, during temperature setting using a remote controller or the like. However, when an operation sound is output each time control is performed on the air-conditioning equipment 602 during sleep, the user's sleep is interrupted.

The air-conditioning setting screen illustrated in FIG. 20 is a screen when the set temperatures of the air-conditioning equipment 602 are set for the respective hourly time points through use of the operation terminal 601. Upon receiving the air-conditioning setting information in which the settings are reflected, the home-appliance control server 603 causes the air-conditioning equipment 602 to output an operation sound, and when transmitting an operation signal to the air-conditioning equipment 602 in the time slots during sleep, the home-appliance control server 603 does not cause the air-conditioning equipment 602 to output an operation sound.

In order to realize this function, the home-appliance control server 603 may add an "operation sound" flag indicating whether or not an operation sound is to be output from the air-conditioning equipment 602 to the format of an operation instruction to be transmitted to the air-conditioning equipment 602. Upon receiving the air-conditioning setting information from the operation terminal 601 during air-conditioning control setting when the start button SB is pressed, the home-appliance control server 603 transmits, to the air-conditioning equipment 602, an operation instruction in which the "operation sound" flag is set to "ON". On the other hand, in the time slots during sleep, when transmitting an operation signal to the air-conditioning equipment 602, the home-appliance control server 603 sets the "operation sound" flag to "OFF". With such an arrangement, the user can confirm that the air-conditioning control system has accepted the air-conditioning control setting performed via the air-conditioning setting screen, by means of the operation sound. In addition, during sleep, since no operation sound is output even when the air-conditioning equipment 602 receives the operation signal, it is possible to prevent sleep disturbance.

Although the air-conditioning equipment 602 has been described as outputting an operation sound during the air-conditioning control setting, an operation sound may be further output again at the end of the sleep time. The end of the sleep time may be the last time the set temperature was set via the air-conditioning setting screen, may be the time at which a wake-up alarm set on the operation terminal 601 is output, or may be wake time determined by the operation terminal 601, when the operation terminal 601 has a function for determining whether or not the user is sleeping or not.

Figures 21A, 21B:
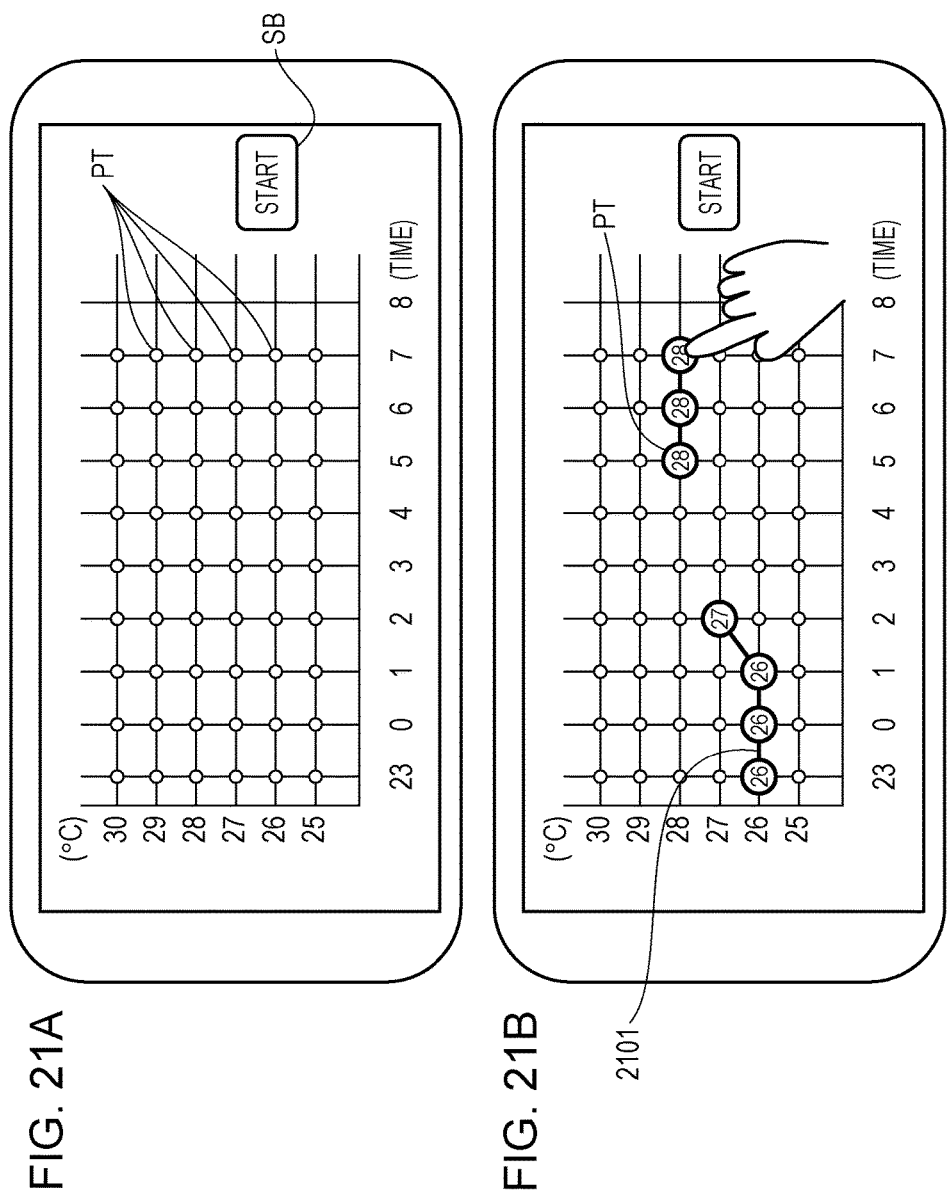
FIGS. 21A and 21B illustrate another example of the air-conditioning setting screen in the embodiment of the present disclosure.

FIGS. 21A and 21B illustrate another example of the air-conditioning setting screen of the air-conditioning equipment 602.

FIG. 21A illustrates an initial screen of the air-conditioning setting screen. On the air-conditioning setting screen, the X-axis represents time, and the Y-axis represents the set temperatures of the air-conditioning equipment 602. In FIGS. 21A and 21B, the X-axis indicates the items of time points from 23:00 to 8:00 in increments of one hour. The Y-axis also indicates the items of temperatures from 25° C. to 30° C. in increments of one degree. In the example in FIGS. 21A and 21B, item lines for the corresponding time-point items are rendered parallel to the Y-axis, item lines for the corresponding temperature items are rendered parallel to the X-axis, and operation points PT are arranged at the intersections of the item lines.

When the user touches the operation point PT, the air-conditioning setting screen generating unit 614 changes the display of the operation point PT from its initial display to a display as illustrated in FIG. 21B. In the example in FIGS. 21A and 21B, when the user touches the operation point PT that was initially displayed as a small circle, the size of the circle is increased compared with that of the initial display, and a numerical value indicating the set temperature is displayed inside the outline of the circle.

The display of the operation point PT changed from the initial display is hereinafter referred to as "setting display". With respect to the time point for which the "setting display" operation point PT is arranged, the screen UI control unit 611 sets the temperature of the air-conditioning equipment 602. On the other hand, with respect to the time point for which the "initial display" operation point PT is arranged, the screen UI control unit 611 determines that the temperature setting has not been performed on the air-conditioning equipment 602. That is, in the example in FIG. 21B, the set temperature for 23:00 is set to 26° C., the set temperature for 0:00 is set to 26° C., the set temperature for 1:00 is set to 26° C., the set temperature for 2:00 is set to 27° C., the set temperature for 5:00 is set to 28° C., the set temperature for 6:00 is set to 28° C., and the set temperature for 7:00 is set to 28° C. When the user touches the operation point PT, the air-conditioning setting screen generating unit 614 changes the display from the "initial display" to the "setting display", as described above. Also, when the user touches the operation point PT that has already been set to the "setting display", the air-conditioning setting screen generating unit 614 returns the display of the operation point PT to the initial display. In the example in FIG. 21B, the air-conditioning setting screen generating unit 614 connects the adjacent "setting display" operation points PT by using straight lines 2101 for display. This allows the user to easily distinguish between the ON period and the OFF period of the air-conditioning equipment 602.

Figure 22:
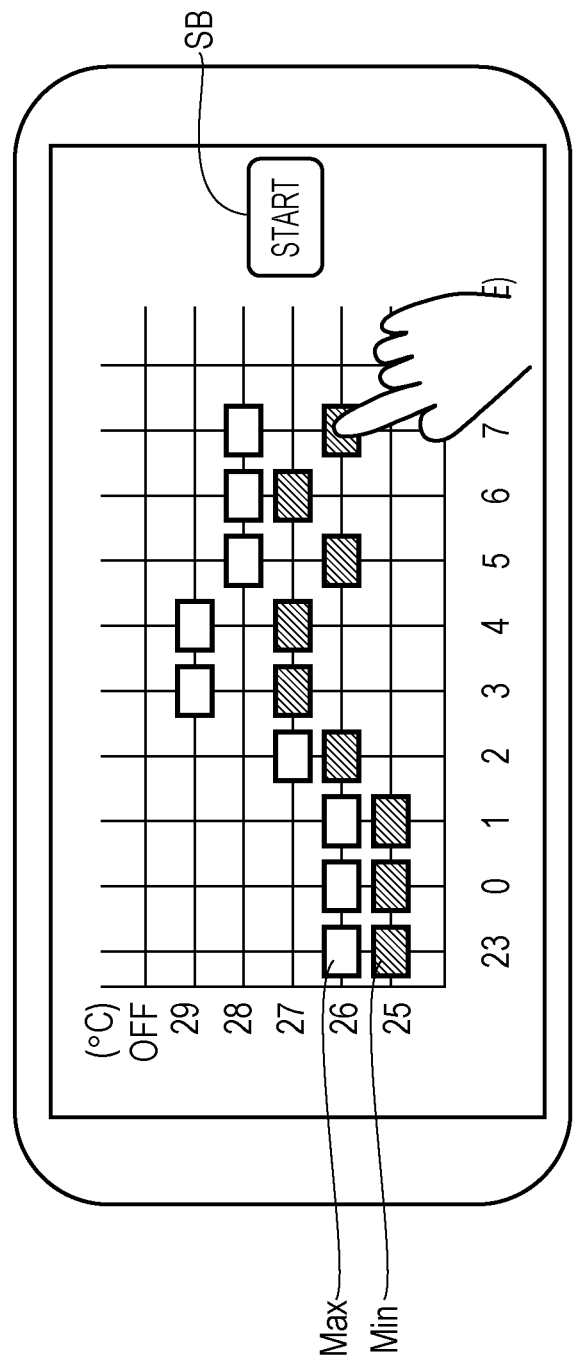
FIG. 22 illustrates another example of the air-conditioning setting screen in the embodiment of the present disclosure.

FIG. 22 illustrates another example of the air-conditioning setting screen. On the air-conditioning setting screen illustrated in FIG. 22, a minimum value and a maximum value of the set temperature can be set for each hourly time point. More specifically, an operation point Max for setting the maximum value of the set temperature and an operation point Min for setting the minimum value of the set temperature are arranged for each hourly time point. The user sets the maximum value of the set temperature by vertically sliding the operation point Max and positioning it at a desired temperature, and also sets the minimum value of the set temperature by vertically sliding the operation point Min and positioning it at a desired temperature. Thereafter, when the setting of the maximum value and the minimum value of the set temperature is finished and the start button SB is pressed, air-conditioning setting information in which the maximum value and the minimum value of the set temperature set for each hourly time point are reflected is accumulated in the air-conditioning setting information DB 616.

With such an arrangement, the air-conditioning equipment 602 can operate in the set temperature range specified by the maximum value and minimum value at each hourly time point. As a result, the degree of freedom of the air-conditioning control increases to allow the air-conditioning equipment 602 to perform, for example, energy-saving operation corresponding to the weather of the day.

Figure 26:
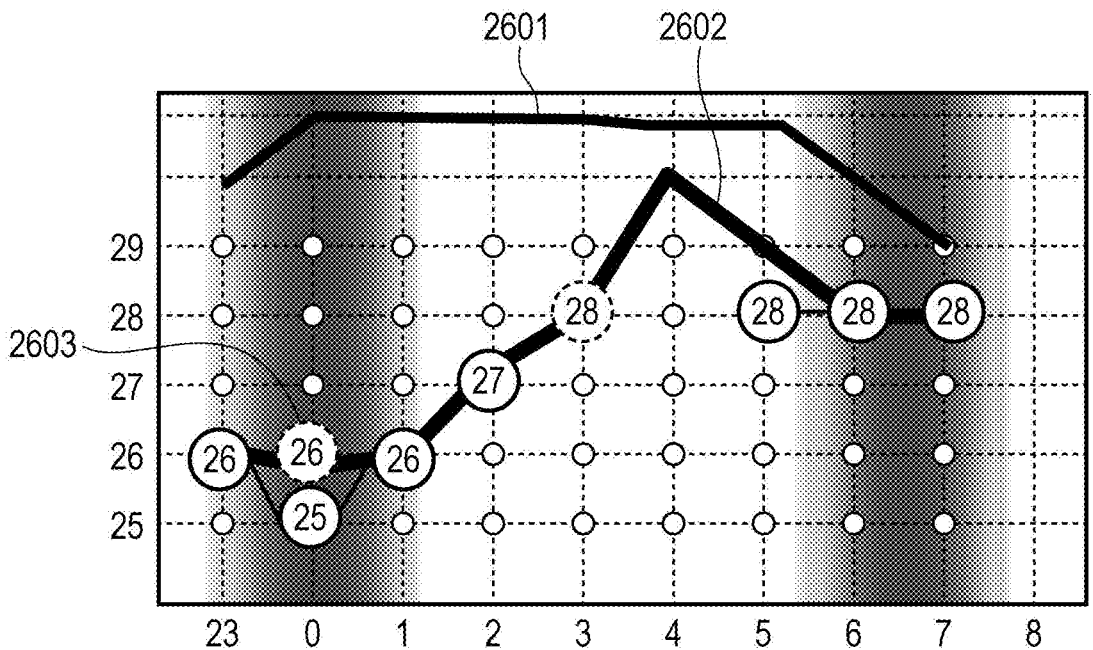
FIG. 26 illustrates another example of the air-conditioning setting screen in the embodiment of the present disclosure.

FIG. 26 illustrates another example of the air-conditioning setting screen. On the air-conditioning setting screen illustrated in FIG. 26, a graph 2601 showing changes in the outdoor temperature over time and a graph 2602 showing changes in the room temperature over time are further displayed, compared with the air-conditioning setting screens illustrated in FIGS. 21A and 21B. The body-movement values are shown in gradation in stripes, as in FIG. 10A. Thus, the user can perform hourly temperature setting, considering the outdoor temperatures and the room temperatures, in addition to the body-movement values.

In addition, on the air-conditioning setting screen illustrated in FIG. 26, recommended temperature points 2603 denoted by dotted-line circles are arranged. The recommended temperature points 2603 are recommended set temperatures of the air-conditioning equipment 602, the temperatures being determined by the air-conditioning control system.

For example, at 0:00, since, 26° C. is a recommended temperature, the recommended temperature point 2603 is positioned at 26° C. The reason why no recommended temperature points 2603 are displayed for 23:00, 1:00, and 2:00 is that the "setting display" recommended temperature points 2603 are displayed in an overlapping manner on the operation points PT.

Figure 27:
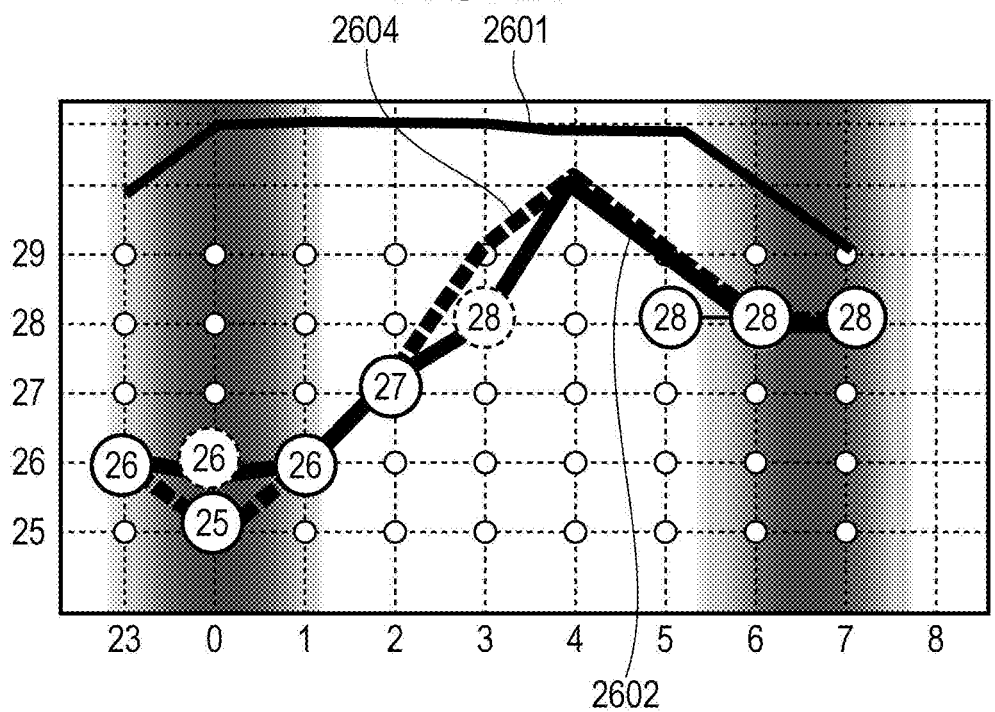
FIG. 27 illustrates another example of the air-conditioning setting screen in the embodiment of the present disclosure.

FIG. 27 illustrates another example of the air-conditioning setting screen. A graph 2604 showing changes in a predicted room temperature over time is further displayed on the air-conditioning setting screen illustrated in FIG. 27, compared with the air-conditioning setting screen illustrated in FIG. 26. Thus, the user can perform hourly temperature setting, considering the predicted room temperatures, in addition to the body-movement values, the outdoor temperatures, and the room temperatures.

The recommended temperatures described above are determined using various parameters. Examples of the parameters include the body-movement value, the room temperature, the room humidity, the electricity cost, the outdoor temperature, PMV, and PPD. A method for determining parameters in the cooling mode will be described below by way of example.

When the body-movement value is used as a parameter, for example, the recommended temperature is determined so that, in a time slot in which the body-movement value is larger than a threshold, the recommended temperature decreases as the difference between the body-movement value and the threshold increases.

When the room temperature is used as a parameter, for example, the recommended temperature is determined so that, in a time slot in which the room temperature is higher than a threshold, the set temperature decreases as the difference between the room temperature and the threshold increases.

When the room humidity is used as a parameter, for example, the recommended temperature is determined so that, in a time slot in which the room humidity is higher than a threshold, the recommended temperature decreases as the difference between the room humidity and the threshold increases.

When the electricity cost is used as a parameter, for example, the recommended temperature is determined so that, in a time slot in which the electricity cost is higher than a threshold, the value of the recommended temperature increases as the difference between the electricity cost and the threshold increases.

When the outdoor temperature is used as a parameter, for example, the recommended temperature is determined so that, in a time slot in which the outdoor temperature is higher than a threshold, the recommended temperature increases as the difference between the outdoor temperature and the threshold increases.

When the PMV is used as a parameter, for example, the recommended temperature is determined so that, in a time slot in which the PMV is larger than a threshold, the recommended temperature decreases as the difference between the PMV and the threshold increases.

A heart rate, a sleep rhythm, a body temperature, a respiration rate, the amount of sleep-talking, the weather, or a brain wave may also be used as a parameter.

The recommended temperatures may also be determined using only one of those parameters or may be determined by a combination of two or more of the parameters. In the latter case, an average value of the recommended temperatures determined for the respective parameters may also be determined to be a final recommended temperature. Alternatively, an average value of the recommended temperatures determined for the respective parameters may be determined to be a final recommended temperature.

In FIGS. 26 and 27, a heart rate, a sleep rhythm, a core body temperature, weather forecast information, a respiration rate, the sound level of snoring, and/or a comfort index may be plotted in a graph and be displayed in a superimposed manner.

Figure 28:
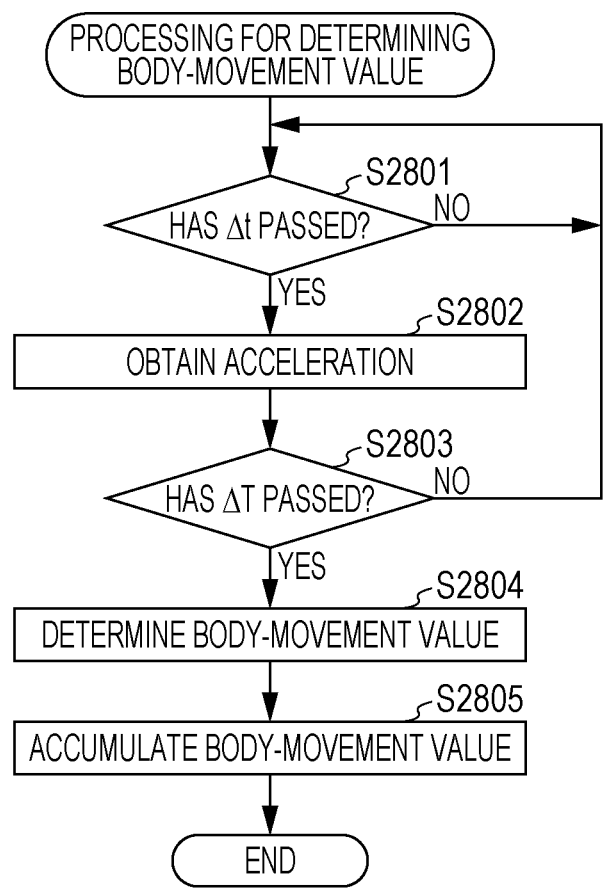
FIG. 28 is a flowchart illustrating processing for determining a body-movement value.

FIG. 28 is a flowchart illustrating processing for determining a body-movement value. First, in S2801, the body-movement measuring unit 615 decides whether or not a certain interval Δt has passed from when acceleration was obtained from the acceleration sensor last time. If the certain interval Δt has passed (YES in S2801), the body-movement measuring unit 615 obtains acceleration from the acceleration sensor (S2802). On the other hand, when the certain interval Δt has not passed (NO in S2801), the body-movement measuring unit 615 returns the process to S2801.

Next, the body-movement measuring unit 615 determines whether or not a measurement time ΔT has passed after a body-movement value was determined last time (S2803). If the measurement time ΔT has passed (YES in S2803), the body-movement measuring unit 615 determines a body-movement value by using the acceleration obtained within the measurement time ΔT (S2804). Details of the determination of the body-movement value have been described above.

Next, the body-movement measuring unit 615 accumulates the determined body-movement value in the body-movement information DB 617 (S2805). The body-movement value of the user is determined for each measurement time ΔT and is accumulated in the body-movement information DB 617. The flowchart in FIG. 28 may be started, for example, upon being triggered by the user inputting a bedtime instruction and may be ended at the end of the user's wake time. For example, the timing of inputting with the start button SB can be used as the input of the bedtime instruction.

Figure 29:
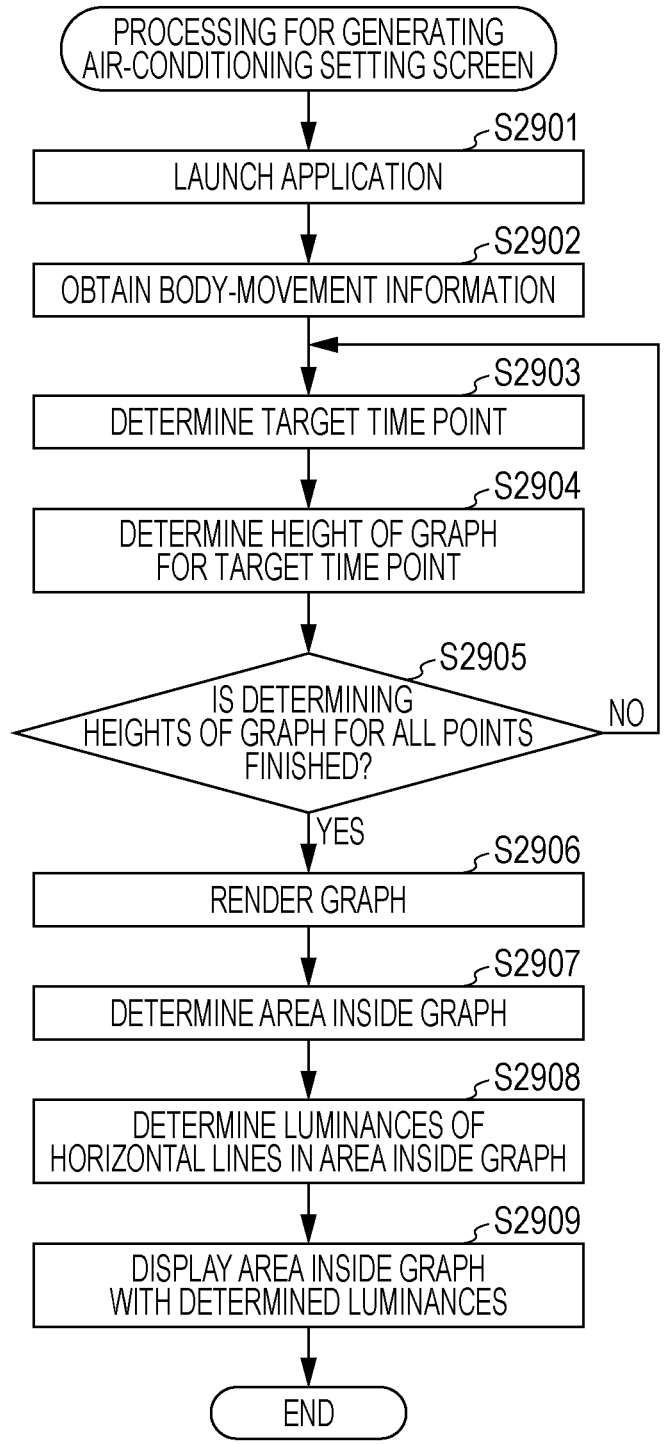
FIG. 29 is a flowchart illustrating processing for generating an air-conditioning setting screen.

FIG. 29 is a flowchart illustrating processing for generating an air-conditioning setting screen. First, in S2901, the operation terminal 601 receives, from the user, an instruction for launching an application for an air-conditioning control service and launches the application. In the case, the operation terminal 601 launches the application, upon detecting a touch on an icon representing the application for the air-conditioning control service.

Next, the air-conditioning setting screen generating unit 614 obtains the body-movement information from the body-movement information DB 617 (S2902). In this case, the air-conditioning setting screen generating unit 614 may obtain the previous day's body-movement information from the body-movement information DB 617 or may obtain, when a particular date is selected on the date selection screen G241 illustrated in FIG. 24, the body-movement information for the selected date from the body-movement information DB 617.

Next, the air-conditioning setting screen generating unit 614 determines a target time point to be processed (S2903). In this case, the target time point is determined in chronological order of the measurement time points of the pieces of body-movement information obtained in S2902.

Next, the air-conditioning setting screen generating unit 614 determines the height of the graph for the target time point, based on the body-movement value indicated by the body-movement information for the target time point (S2904). This determines the height of one point on the graph G251 illustrated in FIG. 25.

Next, upon determining the heights of the graph for all time points indicated by the body-movement information obtained in S2902 (YES in S2905), the air-conditioning setting screen generating unit 614 plots the determined graph heights in a coordinate space of the air-conditioning setting screen and connects the plotted heights by using a spline curve to thereby render the graph (S2906). As a result, the graph G251 illustrated in FIG. 25 is rendered.

On the other hand, if the heights of the graph for all time points have not been determined (NO in S2905), the process returns to S2903. That is, the processes in S2903 to S2905 are repeated to thereby determine the heights in the coordinate space that represent the body-movement values indicated by all of the pieces of body-movement information obtained in S2902.

Next, the air-conditioning setting screen generating unit 614 determines the area inside the graph (S2907). In the example in FIG. 25, the air-conditioning setting screen generating unit 614 determines, as the area inside the graph, the area D251 surrounded by the straight line L251 indicating the bed time, the X-axis, the graph G251, and the straight line (not illustrated) indicating the wake time.

Next, the air-conditioning setting screen generating unit 614 determines the luminances of horizontal lines in the area inside the graph (S2908). In this case, values pre-defined according to the magnitudes of the body-movement values are used as the luminances of the horizontal lines, and a higher luminance is set for a horizontal line for a larger body-movement value.

Next, the horizontal lines in the area inside the graph are rendered with the respective determined luminances (S2909). As a result, as illustrated in FIG. 25, the area D251 is rendered such that the luminance increases toward the upper side.

FIG. 30 is a flowchart illustrating processing performed in the air-conditioning control system when an operation signal is transmitted to the air-conditioning equipment 602.

First, if a user operation on the air-conditioning setting screen is finished (YES in S3101), the screen UI control unit 611 in the operation terminal 601 accumulates, in the air-conditioning setting information DB 616, the air-conditioning setting information indicating hourly set temperatures input by the user via the air-conditioning setting screen (S3102). For example, in the example in FIGS. 10A and 10B, nine pieces of air-conditioning setting information indicating the set temperatures for nine hourly time points from 23:00 to 7:00 are accumulated in the air-conditioning setting information DB 616.

On the other hand, if the operation on the air-conditioning setting screen is not finished (NO in S3101), the process returns to S3101. In this case, in the example in FIGS. 10A and 10B, the operation on the air-conditioning setting screen is finished when the start button SB is pressed.

After S3102, if a control timing has arrived (YES in S3103), the air-conditioning executing unit 612 transmits an operation signal for the corresponding air-conditioning setting information to the home-appliance control server 603 by using the communication unit 613 (S3104). On the other hand, if the control timing has not arrived (NO in S3103), the air-conditioning executing unit 612 determines whether or not the wake time has arrived (S3105). In this case, when the time clocked by the timer reaches the "execution time" in any of the pieces of air-conditioning setting information registered in the air-conditioning setting information DB 616, the air-conditioning executing unit 612 determines that the control timing has arrived. In the example in FIG. 8, for instance, "Aug. 24, 2013, 02:00" is registered as the "execution time" in the air-conditioning setting information in which the "operation ID" is "4". Thus, when the time clocked by the timer reaches Aug. 24, 2013, 02:00, the air-conditioning executing unit 612 determines that the control timing has arrived.

If the wake time has not arrived (NO in S3105), the process returns to S3103, and when the wake time has arrived (YES in S3105), the process ends.

The home-appliance control server 603 receives the operation signal (S3201) and transmits the received operation signal to the air-conditioning equipment 602 to be controlled (S3202).

Next, the communication unit 621 in the air-conditioning equipment 602 receives the operation signal (S3301), and the air-conditioning control unit 622 executes a control operation indicated by the operation signal (S3302). For example, when it is assumed that an operation signal for the air-conditioning setting information (illustrated in FIG. 8) in which the "operation ID" is "4" is transmitted, the air-conditioning control unit 622 executes control for changing the set temperature from 26° C. to 27° C. As a result, the air-conditioning equipment 602 is controlled so as to operate at the set temperatures input by the user via the air-conditioning setting screen.

Thus, according to the present embodiment, when the user performs air-conditioner temperature setting for each hourly time point for the sleep time, changes in the body-movement value over time is also displayed, thus allowing the user to easily perform an operation for temperature setting for each hourly time point.

The technology described in the above-described arrangements can be realized, for example, by the following types of cloud service. However, the technology described in the above-described arrangements is not limited to these types.

(Service Type 1: In-House Data Center Type)

Figure 2:
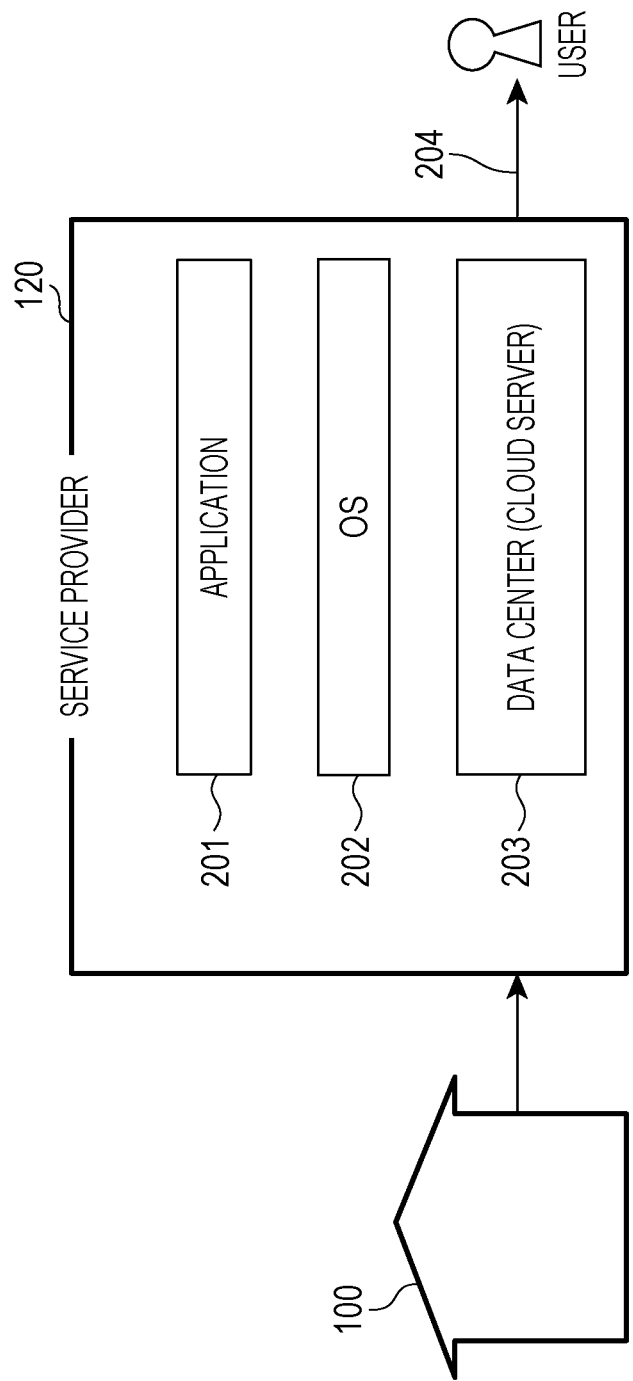
FIG. 2 illustrates a service type (an in-house data center type) in the embodiment of the present disclosure.

FIG. 2 illustrates service type 1 (an in-house data center type). This type is a type in which a service provider 120 obtains information from a group 100 and provides the user with a service. In this type, the service provider 120 has functions of a data-center operating company. That is, the service provider 120 has a cloud server 111 for managing big data. Thus, no data-center operating company exists.

In this type, the service provider 120 operates and manages a data center 203 (the cloud server 111). The service provider 120 also manages an OS 202 and an application 201. The service provider 120 provides a service by using the OS 202 and the application 201 managed by the service provider 120 (as denoted by 204).

(Service Type 2: IaaS Using Type)

Figure 3:
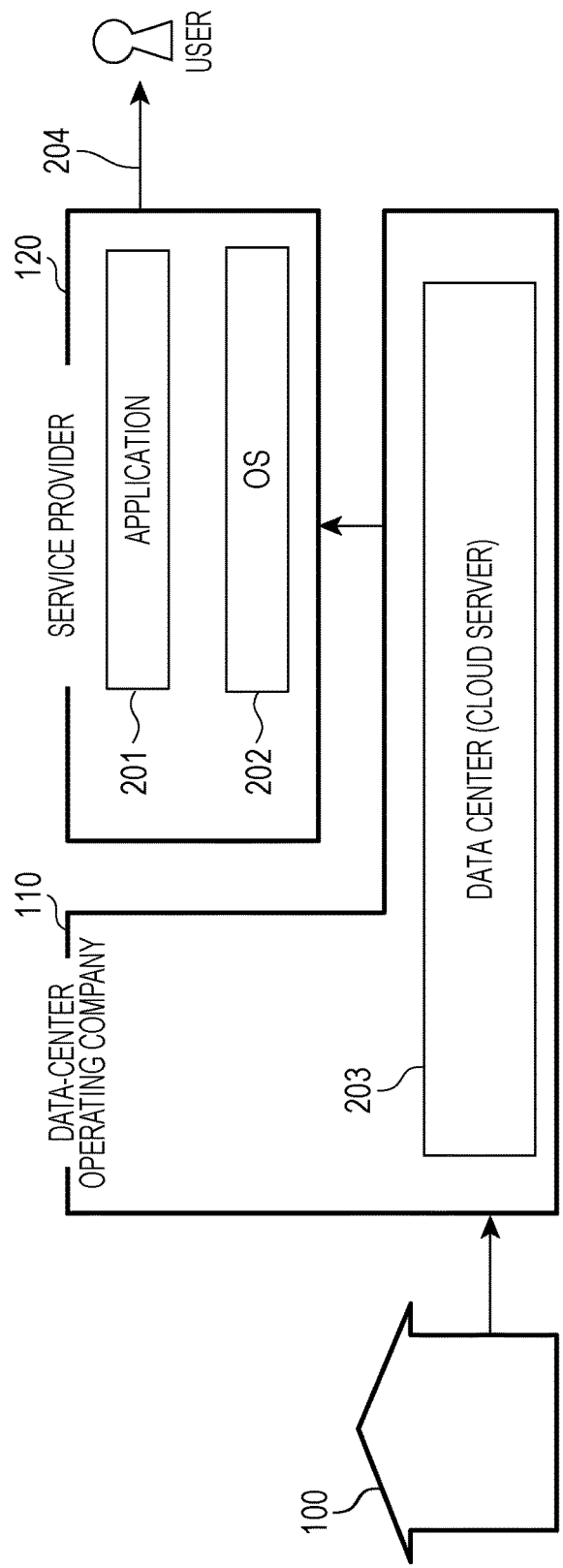
FIG. 3 illustrates a service type (an IaaS using type) in the embodiment of the present disclosure.

FIG. 3 illustrates service type 2 (an IaaS using type). IaaS is an acronym of Infrastructure as a Service and is a cloud-service-providing model that provides, as a service over the Internet, infrastructure itself for constructing and operating a computer system.

In this type, a data-center operating company 110 operates and manages a data center 203 (a cloud server 111). A service provider 120 manages an OS 202 and an application 201. The service provider 120 provides a service by using the OS 202 and the application 201 managed by the service provider 120 (as denoted by 204).

(Service Type 3: PaaS Using Type)

FIG. 4 illustrates service type 3 (a PaaS using type). PaaS is an acronym of Platform as a Service and is a cloud-service-providing model that provides, as a service over the Internet, a platform that serves as a foundation for constructing and operating software.

In this type, a data-center operating company 110 manages an OS 202 and operates and manages a data center 203 (a cloud server 111). The service provider 120 manages an application 201. The service provider 120 provides a service by using the OS 202 managed by the data-center operating company 110 and the application 201 managed by the service provider 120 (as denoted by 204).

(Service Type 4: SaaS Using Type)

FIG. 5 illustrates service type 4 (a SaaS using type). SaaS is an acronym of Software as a Service. SasS is a cloud-service-providing model having a function by which, for example, companies and individuals (users) that do not own a data center (cloud server) can use, over a network such as the Internet, applications provided by a platform provider that owns a data center (cloud server).

In this type, a data-center operating company 110 manages an application 201 and an OS 202 and operates and manages a data center 203 (a cloud server 111). A service provider 120 provides a service by using the OS 202 and the application 201 managed by the data-center operating company 110 (as denoted by 204).

It is assumed that, in any of the types described above, the service provider 120 is assumed to provide a service. For example, the service provider 120 or the data-center operating company 110 may develop the OS, the application, a database for big data, or the like by itself or may also outsource the development to a third party.

The air-conditioning control system according to one aspect of the present disclosure allows a user to easily control air-conditioning equipment for sleep time. Therefore, the air-conditioning control system according to the present disclosure is highly applicable in the home appliance industry.

What is claimed is:

1. A control method for a mobile information terminal having a display to control air-conditioning equipment connected through a network, the method causing the mobile information terminal to:
   display, on the display, a temperature setting screen on which set temperatures of the air-conditioning equipment are settable for respective time slots;
   output pieces of set temperature information for the respective time slots set on the temperature setting screen to the network at a predetermined timing as the set temperatures of the air-conditioning equipment;
   measure body-movement values of a user for the respective time slots, by using an acceleration sensor; and
   change a view of the temperature setting screen, based on the body-movement values of the user for the time slots, and display the view on the display.

2. The control method according to claim 1, wherein background color of the temperature setting screen is changed based on the body-movement values of the user for the respective time slots, and resulting background color is displayed on the display.

3. The control method according to claim 1, wherein the temperature setting screen includes images indicating temperature setting portions for the respective time slots,
   the images indicating the temperature setting portions for the respective time slots are changed based on the body-movement values of the user for the respective time slots, and
   the resulting images are displayed on the display.

4. The control method according to claim 3, wherein colors of the images indicating the temperature setting portions for the respective time slots are changed based on the body-movement values of the user for the respective time slots, and the resulting images are displayed on the display.

5. The control method according to claim 3, wherein sizes of the images indicating the temperature setting portions for the respective time slots are changed based on the body-movement values of the user for the respective time slots, and the resulting images are displayed on the display.

6. The control method according to claim 2, wherein, on the temperature setting screen, a background color for the time slot in which the body-movement value of the user exceeds a predetermined threshold is displayed on the display, the background color being different from a background color for another time slot.

7. The control method according to claim 4, wherein, on the temperature setting screen, the color of the image indicating the temperature setting portion for the time slot in which the body-movement value of the user exceeds a predetermined threshold is displayed on the display by using a color different from the color of the image indicating the temperature setting portion for another time slot.

8. The control method according to claim 5, wherein, on the temperature setting screen, the image indicating the temperature setting portion for the time slot in which the body-movement value of the user exceeds a predetermined threshold is displayed on the display with a larger size than the size of the image indicating the temperature setting portion for another time slot.

9. The control method according to claim 1, wherein a graph indicating the body-movement values of the user in a time series is displayed superimposed on the temperature setting screen on the display.

10. The control method according to claim 9, wherein, on the temperature setting screen, luminance of an area inside the graph indicating the body-movement values in a time series is displayed such that an area where the body-movement value is larger is displayed with a higher luminance.

11. The control method according to claim 1, wherein
   the temperature setting screen includes a control start button for outputting, when the user starts to sleep, the pieces of set temperature information for the respective time slots to the network, the pieces of set temperature information being set on the temperature setting screen; and
   the predetermined timing is timing at which an operation for selecting the control start button is input.

12. The control method according to claim 11, wherein
   the set temperature information comprises information for time slots during sleep of the user; and
   the view of the temperature setting screen is changed based on past body-movement values of the user in respective time slots during sleep.

13. A program for causing a mobile information terminal having a display to control an air-conditioning equipment connected through a network, the program being recorded on a non-transitory computer-readable recording medium and causing the mobile information terminal to execute:
   processing for displaying, on the display, a temperature setting screen on which set temperatures of the air-conditioning equipment are settable for respective time slots;
   processing for outputting pieces of set temperature information for the respective time slots set on the temperature setting screen to the network at a predetermined timing as the set temperatures of the air-conditioning equipment;

processing for measuring body-movement values of a user for the respective time slots, by using an acceleration sensor; and processing for changing a view of the temperature setting screen, based on the body-movement values of the user for the time slots, and displaying the view on the display.

14. A mobile information terminal that executes the program according to claim 13.

* * * * *